(12) United States Patent
Tominaga et al.

(10) Patent No.: US 10,938,278 B2
(45) Date of Patent: Mar. 2, 2021

(54) VEHICLE

(71) Applicant: TOYOTA JIDOSHA KABUSHIKI KAISHA, Toyota (JP)

(72) Inventors: Satoshi Tominaga, Susono (JP); Daisuke Tokozakura, Susono (JP); Yushi Seki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 438 days.

(21) Appl. No.: 16/027,702

(22) Filed: Jul. 5, 2018

(65) Prior Publication Data
US 2019/0068028 A1 Feb. 28, 2019

(30) Foreign Application Priority Data
Aug. 30, 2017 (JP) .................. 2017-166028

(51) Int. Cl.
*H02K 9/19* (2006.01)
*B60K 11/02* (2006.01)
(Continued)

(52) U.S. Cl.
CPC ............. *H02K 9/19* (2013.01); *B60K 7/0007* (2013.01); *B60K 11/02* (2013.01); *B60K 17/354* (2013.01); *B60K 17/356* (2013.01); *B60L 58/26* (2019.02); *B60L 58/27* (2019.02); *H02K 7/006* (2013.01); *H02K 7/14* (2013.01); *H02K 11/0094* (2013.01); *H02K 11/33* (2016.01); *B60K 2001/003* (2013.01); *B60K 2001/005* (2013.01); *B60K 2001/006* (2013.01); *B60K 2007/0038* (2013.01); *B60K 2007/0092* (2013.01); *B60L 2220/46* (2013.01); *B60L 2240/425* (2013.01); *B60L 2240/525* (2013.01); *Y02T 10/64* (2013.01); *Y02T 10/70* (2013.01); *Y02T 10/72* (2013.01)

(58) Field of Classification Search
CPC .................................. H02K 9/19; B60K 11/02
USPC .................................... 310/12.29, 52, 54, 64
See application file for complete search history.

(56) References Cited

U.S. PATENT DOCUMENTS 5,345,777 A * 9/1994 Sekino ...................... B60L 1/02
62/244
8,251,167 B2 * 8/2012 Moriguchi ........... B60K 7/0007
180/65.51
(Continued)

FOREIGN PATENT DOCUMENTS

JP 2003047202 A * 2/2003
JP 2005-073364 A 3/2005
(Continued)

*Primary Examiner* — Gary A Nash
(74) *Attorney, Agent, or Firm* — Oliff PLC

(57) ABSTRACT

There are provided in-wheel motors lubricated with an oil; a cooling medium circuit in which a cooling medium flows; a cooling device cooling the cooling medium; heat exchangers carrying out heat exchange between the cooling medium and the oil after lubricating the in-wheel motors; and at least one of a controller including an inverter and a battery that can be cooled by the cooling medium flowing through the cooling medium circuit, and the cooling medium circuit has such a configuration that circulates the cooling medium through the cooling device, at least one of the controller and the battery, and the heat exchangers in turn.

15 Claims, 17 Drawing Sheets

(51) Int. Cl.
*B60K 7/00* (2006.01)
*H02K 11/00* (2016.01)
*H02K 11/33* (2016.01)
*H02K 7/00* (2006.01)
*B60K 17/354* (2006.01)
*H02K 7/14* (2006.01)
*B60K 17/356* (2006.01)
*B60L 58/26* (2019.01)
*B60L 58/27* (2019.01)
*B60K 1/00* (2006.01)

(56) References Cited

U.S. PATENT DOCUMENTS

| | | | | |
|---|---|---|---|---|
| 2009/0195093 | A1* | 8/2009 | Bandai | B60K 6/365 310/54 |
| 2012/0181848 | A1* | 7/2012 | Makino | F16H 1/32 301/6.5 |
| 2013/0320677 | A1 | 12/2013 | Yamada et al. | |
| 2015/0367839 | A1* | 12/2015 | Murata | H02K 7/116 475/2 |
| 2016/0236748 | A1* | 8/2016 | Matsuda | H02K 7/116 |

FOREIGN PATENT DOCUMENTS

| | | | |
|---|---|---|---|
| JP | 2005-093185 A | | 4/2005 |
| JP | 2005-237176 A | | 9/2005 |
| JP | 2008-195233 A | | 8/2008 |
| JP | 2009-120021 A | | 6/2009 |
| JP | 2009-227130 A | | 10/2009 |
| JP | 2009-241911 A | | 10/2009 |
| JP | 2009248828 A | * | 10/2009 |
| JP | 2011-097706 A | | 5/2011 |
| JP | 2012-176634 A | | 9/2012 |
| JP | 2013-247768 A | | 12/2013 |
| JP | 2015-058732 A | | 3/2015 |
| JP | 2015-132315 A | | 7/2015 |
| JP | 2015-139333 A | | 7/2015 |

* cited by examiner

FIG. 15A
FIG. 15B
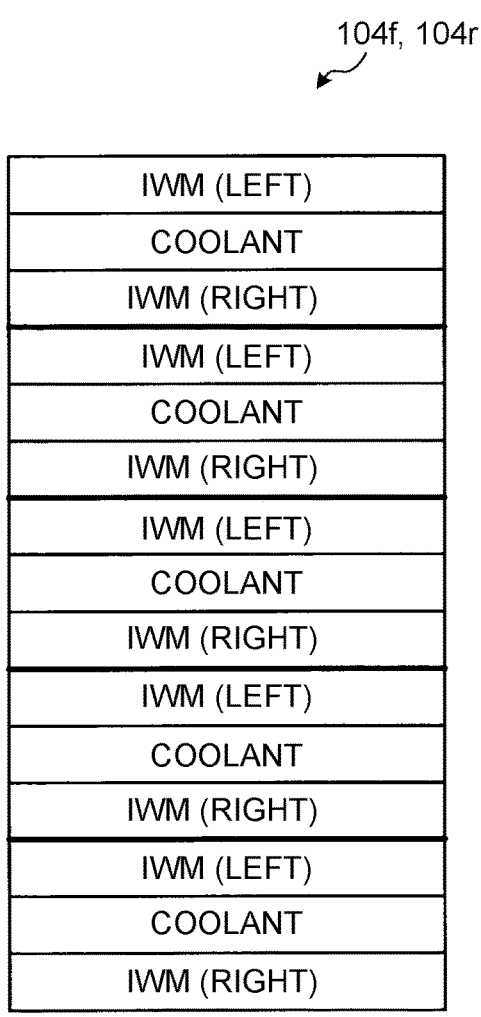
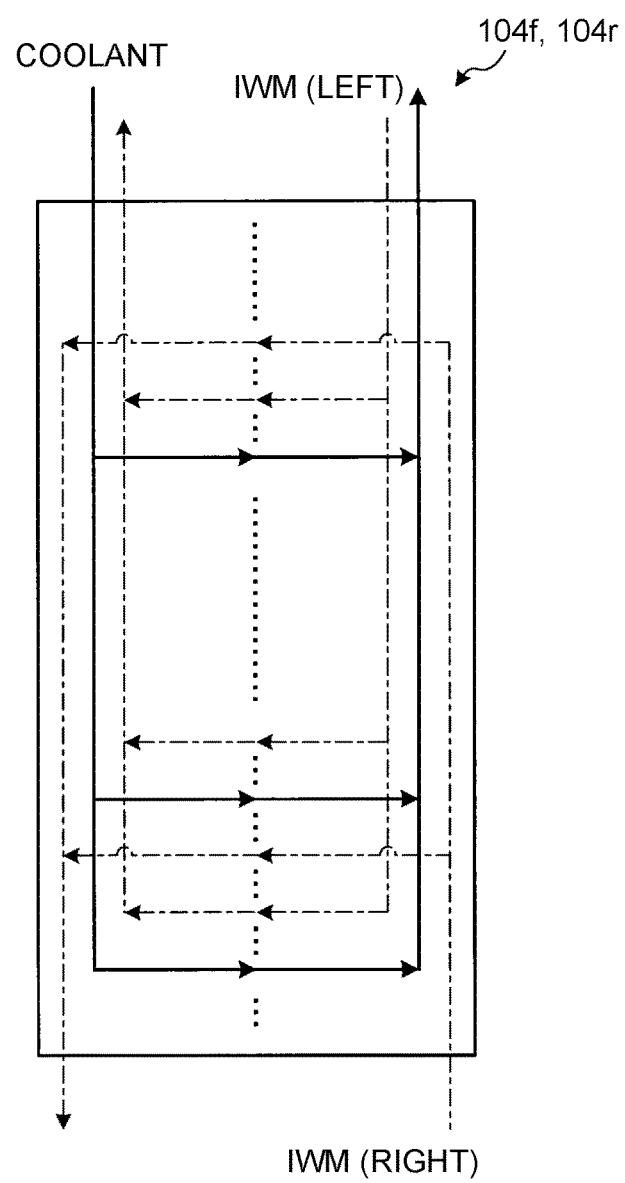

VEHICLE

INCORPORATION BY REFERENCE

The disclosure of Japanese Patent Application No. 2017-166028 filed on Aug. 30, 2017 including the specification, drawings and abstract is incorporated herein by reference in its entirety.

BACKGROUND

1. Technical Field

The present disclosure relates to a vehicle including in-wheel motors.

2. Description of Related Art

In vehicles including in-wheel motors, there have been proposed various cooling mechanisms to cool the in-wheel motors. Japanese Patent Application publication No. 2009-227130 (JP 2009-227130 A) discloses a cooling apparatus for in-wheel motors, including: casings disposed in inner spaces of respective wheels, each casing accommodating an electric motor connected to each wheel so as to transmit driving power to the wheel; a vehicle body supporting the wheels and the casings via a suspension system; a lubrication oil (oil) accommodated in each casing, the lubrication oil lubricating and cooling parts to be lubricated inside the casing. In the cooling apparatus for the in-wheel motors described in JP 2009-227130 A, as an example of a cooling mechanism to cool the oil flowing through an oil passage, described is such a configuration that oil coolers of the water-cooling type carrying out heat exchange with a cooling medium are provided in the middle of the oil passage.

SUMMARY

In the configuration of providing the above-described oil coolers of the water-cooling type, it becomes necessary to provide pipes for supplying the oil coolers of the water-cooling type with the cooling medium. Normally, the cooling medium is cooled by a cooling device such as a radiator located at a frontward position in the vehicle. Hence, in particular, in order to supply the oil coolers of the in-wheel motors for the rear wheels with the cooling medium, it becomes necessary to newly provide piping for supplying the cooling medium from the front to the rear of the vehicle. In this case, if the cooling performance of the cooling mechanism using the cooling medium is attempted to be improved, a space spared for installing other members therein is occupied by the piping for the cooling medium. Consequently, flexibility in installation of a battery and a controller having inverter to control the in-wheel motors become deteriorated.

The present disclosure provides a vehicle capable of enhancing cooling performance of a cooling mechanism using a cooling medium inside the vehicle, and also enhancing flexibility in installation of a battery and a controller having an inverter.

A vehicle according to the present disclosure includes multiple wheels for traveling, in-wheel motors, a cooling medium circuit in which a cooling medium flows, a cooling device, heat exchangers, and at least one of a battery and a controller including an inverter. The in-wheel motors are provided to the respective wheels. The in-wheel motors are configured to drive the respective wheels. The in-wheel motors are lubricated by an oil. The cooling device is configured to cool the cooling medium. The heat exchangers are configured to carry out heat exchange between the cooling medium and the oil after lubricating the in-wheel motors. The battery and the controller can be cooled by the cooling medium flowing through the cooling medium circuit. The cooling medium circuit is configured to circulate the cooling medium through the cooling device, the at least one of the battery and the controller, and the heat exchangers in turn.

In the vehicle, the in-wheel motors may include in-wheel motors for front wheels and in-wheel motors for rear wheels, the heat exchangers may include at least one heat exchanger for the front wheels and at least one heat exchanger for the rear wheels, the at least one heat exchanger for the front wheels may be configured to carry out heat exchange with the oil after flowing through the in-wheel motors for the front wheels, and may be disposed at a frontward position in a front-rear direction of the vehicle, and the at least one heat exchanger for the rear wheels may be configured to carry out heat exchange with the oil after flowing through the in-wheel motors for the rear wheels, and may be disposed at a rearward position in the front-rear direction of the vehicle.

With this configuration, by providing the in-wheel motors for the front wheels and the in-wheel motors for the rear wheels respectively with the heat exchangers, it is possible to shorten the oil passage extending from the in-wheel motors to the heat exchangers.

In the vehicle, the cooling device may be provided at a frontward position in the vehicle, and the at least one heat exchanger for the front wheels may be provided downstream of the at least one heat exchanger for the rear Wheels along the flowing direction of the cooling medium in the cooling medium circuit.

With this configuration, if the cooling device is provided at a frontward position in the vehicle, the cooling medium circuit can be arranged to extend from the front to the rear and from the rear to the front in the vehicle so as to improve thermal efficiency.

In the vehicle, the cooling device may be provided at a frontward position in the vehicle. A branching point between a first cooling-medium flow passage connected to the at least one heat exchanger for the front wheels and a second cooling-medium flow passage connected to the at least one heat exchanger for the rear wheels may be located downstream of at least one of the controller including the inverter and the battery, along the flowing direction of the cooling medium in the cooling medium circuit.

With this configuration, the cooling medium circuit is provided in parallel to the heat exchangers for the front wheels and the heat exchangers for the rear wheels; thus, compared with the case in which the heat exchangers for the front wheels and the heat exchangers for the rear wheels are so arranged as to allow the cooling medium to flow in the cooling medium circuit in series, it is possible to lower the temperature of the coolant of the heat exchangers for the front wheels at the inlet, to thereby enhance the cooling performance.

The vehicle may further include a distribution regulating valve and an electronic control unit. The distribution regulating valve may be configured to regulate a distribution of flow rate to the first cooling-medium flow passage and a flow rate to the second cooling-medium flow passage when the cooling medium is distributed to the first cooling-medium flow passage and the second cooling-medium flow passage in the cooling medium circuit. The electronic control unit may be configured to control the distribution of the flow rates in the distribution regulating valve. The cooling medium circuit may include a joint point. The first cooling-medium flow passage and the second cooling-medium flow passage may be joined to each other at the joint point. The distribution regulating valve may be provided to the branching point or the joint point in the cooling medium circuit. The electronic control unit may be configured to control an aperture of the distribution regulating valve based on parameters contribution to heat generation of the in-wheel motors for the front wheels and the in-wheel motors for the rear wheels.

With this configuration, based on the parameters in the in-wheel motors regarding the temperatures and generated heat amounts of the in-wheel motors, the flow rate distribution by the valve is carried out, to thereby enhance the cooling performance of the in-wheel motors.

In the vehicle, the in-wheel motors may include in-wheel motors for front wheels and in-wheel motors for rear wheels. The cooling medium circuit may be provided to in-wheel motors for wheels not steered among the in-wheel motors for the front wheels and the in-wheel motors for the rear wheels. The electronic control unit may be configured to change a distribution between driving force of the in-wheel motors for the front wheels and driving force of the in-wheel motors for the rear wheels based on temperatures or generated heat amounts of the in-wheel motors for the front wheels and the in-wheel motors for the rear wheels.

With this configuration, by changing the distribution of the driving force, it is possible to lower the temperatures of the in-wheel motors as a whole.

The vehicle may further include an air heater introducing air into a cabin of the vehicle. Temperature of the air introduced into the cabin may be increased through heat exchange with the cooling medium. The in-wheel motors may include in-wheel motors for rear wheels. The heat exchangers include at least one heat exchanger for the rear wheels. The at least one heat exchanger for the rear wheels may be configured to carry out heat exchange with the oil after flowing through the in-wheel motors for the rear wheels. The air heater may be provided downstream of the at least one heat exchanger for the rear wheels along the flowing direction of the cooling medium.

With this configuration, since the air whose temperature is increased by the heat of the coolant using the air heater can be introduced into the cabin, it is possible to suppress consumption of electric power used for increasing the temperature of the cabin.

In the vehicle, the in-wheel motors may include in-wheel motors for left wheels and in-wheel motors for right wheels, and the heat exchangers may be configured to carry out heat exchange between oil for the left wheels flowing out from the in-wheel motors for the left wheels as well as oil for the right wheels flowing out from the in-wheel motors for the right wheels, and the cooling medium flowing into the same case of the heat exchangers.

With this configuration, since the oil from the in-wheel motors for the left wheels and the oil from the in-wheel motors for the right wheels are heat-exchanged with the common cooling medium, it is possible to reduce the number of the heat exchangers.

In the vehicle, the in-wheel motors may include in-wheel motors for left wheels and in-wheel motors for right wheels, and the heat exchangers may be configured to carry out heat exchange between oil for the left wheels flowing out from the in-wheel motors for left wheels as well as oil for the right wheels flowing out from the in-wheel motors for the right wheels, and the cooling medium, wherein the oil for the left wheels, the oil for the right wheels, and the cooling medium flow into the same case of the heat exchangers.

With this configuration, since the heat exchange is carried out between the oil for the left wheels and the oil for the right wheels, it is possible to substantially equalize the temperature of the oil for the left wheels for cooling the in-wheel motors for the left wheels to the temperature of the oil for the right wheels for cooling the in-wheel motors for the right wheels. Through this, it is possible to reduce demagnetization of magnets composing the in-wheel motors. In addition, if a difference in temperature is generated between the in-wheel motors for left wheels and the in-wheel motors for right wheels, it is possible to increase the temperatures of the respective in-wheel motors on the average, to thereby reduce mechanical friction.

The vehicle may further include an oil pump. The in-wheel Motors may include in-wheel motors for left wheels and in-wheel motors for right wheels. The oil pump may be configured to circulate the oil among the heat exchanger, the in-wheel motors for the left wheels, and the in-wheel motors for the right wheels.

With this configuration, since the number of the oil pumps can be reduced, it is possible to attain reduction in cost and weight in the vehicle.

In the vehicle, the oil pump may be configured to switch a circulating direction of the oil among the heat exchanger, the in-wheel motors for the left wheels, and the in-wheel motors for the right wheels.

With this configuration, it is possible to carry out switching between the order from the heat exchanger, the in-wheel motors for the left wheels to the in-wheel motors for the right wheels and the order from the heat exchanger, the in-wheel motors for the right wheels to the in-wheel motors for the left wheels.

The vehicle may further include an inflow-side distribution valve. The inflow-side distribution valve may be configured to distribute the cooling medium to a cooling medium to flow into the cooling device and to a cooling medium to be diverted toward the cooling medium circuit from the cooling device to the battery or the controller. The electronic control unit may be configured to control a distribution proportion in the inflow-side valve between a flow rate of the cooling medium to flow into the cooling device and a flow rate of the cooling medium to be diverted to an outflow-side of the cooling device, based on parameters contributing to heat generation of the in-wheel motors.

With this configuration, the amount of the cooling medium cooled by the cooling device can be reduced; therefore, if the vehicle is started up at the coldest time in a cold region or the like, the coolant increased in temperature can be used for the temperature adjustment of the battery, such as warming-up of the battery, and thus it is possible to maintain the battery at an appropriate temperature so as to enhance service duration of the battery as well as electric efficiency; thus a cruising distance of the vehicle can be increased.

The vehicle may further include an outflow-side joint valve. The outflow-side joint valve may be provided to the cooling medium circuit from the cooling device to the battery or to the cooling medium circuit from the cooling device to the controller. The outflow-side joint valve may be configured to regulate a flow rate of the cooling medium flowing out from the cooling device and a flow rate of the cooling medium diverted from the cooling medium flowing into the cooling device. The electronic control unit may be configured to control a flow rate of the cooling medium that is diverted from the cooling medium flowing into the cooling device, and flows into the outflow-side joint valve, based on parameters contributing to heat generation of the in-wheel motors.

With this configuration, the amount of the cooling medium cooled by the cooling device can be reduced; therefore, if the vehicle is started up at the coldest time in a cold region or the like, the coolant increased in temperature can be used for the temperature adjustment of the battery, such as warming-up of the battery, and thus it is possible to maintain the battery at an appropriate temperature so as to enhance service duration of the battery as well as electric efficiency; thus a cruising distance of the vehicle can be increased.

In the vehicle, the in-wheel motors may include in-wheel motors for the left wheels and in-wheel motors for the right wheels. The heat exchangers may include a heat exchanger for a left wheel and a heat exchanger for a right wheel. The heat exchanger for the left wheel may be directly mounted to the at least one of the in-wheel motors for left wheels. The heat exchanger for the right wheel may be directly mounted to the at least one of the in-wheel motors for right wheels.

With this configuration, by providing the in-wheel motor in each wheel of the left wheels and the right wheels with the heat exchanger, it is possible to shorten the flow passage of the oil between the in-wheel motor and the heat exchanger, to thereby attain cost reduction.

The vehicle may further include a distribution regulating valve. The distribution regulating valve may be configured to regulate a distribution of flow rates to multiple cooling-medium flow passages when the cooling medium is distributed to the multiple cooling-medium flow passages in the cooling medium circuit. The electronic control unit may be configured to control the distribution of the flow rates in the distribution regulating valve. The distribution regulating valve may be disposed between the heat exchanger for the left wheel and the heat exchanger for the right wheel in the cooling medium circuit. The electronic control unit may be configured to control a distribution proportion between a flow rate of the cooling medium toward the heat exchanger for the left wheel and a flow rate of the cooling medium toward the heat exchanger for the right wheel based on parameters contributing to heat generation of the in-wheel motors for the left wheels and the in-wheel motors for the right wheels.

With this configuration, by regulating the distribution proportion between the flow rate of the cooling medium toward the heat exchanger for the left wheel and the flow rate of the cooling medium toward the heat exchanger for the right wheel by the distribution regulating valve based on the temperature and the generated heat amount of the in-wheel motors, it is possible to enhance the cooling performance of the in-wheel motors.

In the vehicle, the cooling medium circuit may be configured to circulate the cooling medium through the cooling device, the battery, the controller, and the heat exchangers in turn.

With this configuration, the battery most highly required to be cooled can be cooled by the cooling medium having the lowest temperature cooled by the cooling device, thus enhancing the cooling performance in the cooling circuit.

According to the vehicle of the present disclosure, at least one of the battery highly required to be cooled and having a lower target cooling temperature and the controller having an inverter is cooled by the cooling medium before the heat exchangers of the oil used for cooling the in-wheel motors, to thereby efficiently utilize the difference in temperature between the cooling medium, and the battery and the controller having the inverter, and also to suppress increase in the number of pipes of the cooling medium; therefore, it is possible to enhance the cooling performance of the cooling mechanism using the cooling medium inside the vehicle as well as enhance flexibility in installation of the controller having the inverter, the battery, and others into the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 15A is a schematic diagram showing an internal configuration of an IWM oil cooler according to a second example;

FIG. 15B is a schematic view explaining flows of an oil and a coolant inside the IWM oil cooler according to the second example;

DETAILED DESCRIPTION OF EMBODIMENTS

Figure 1:
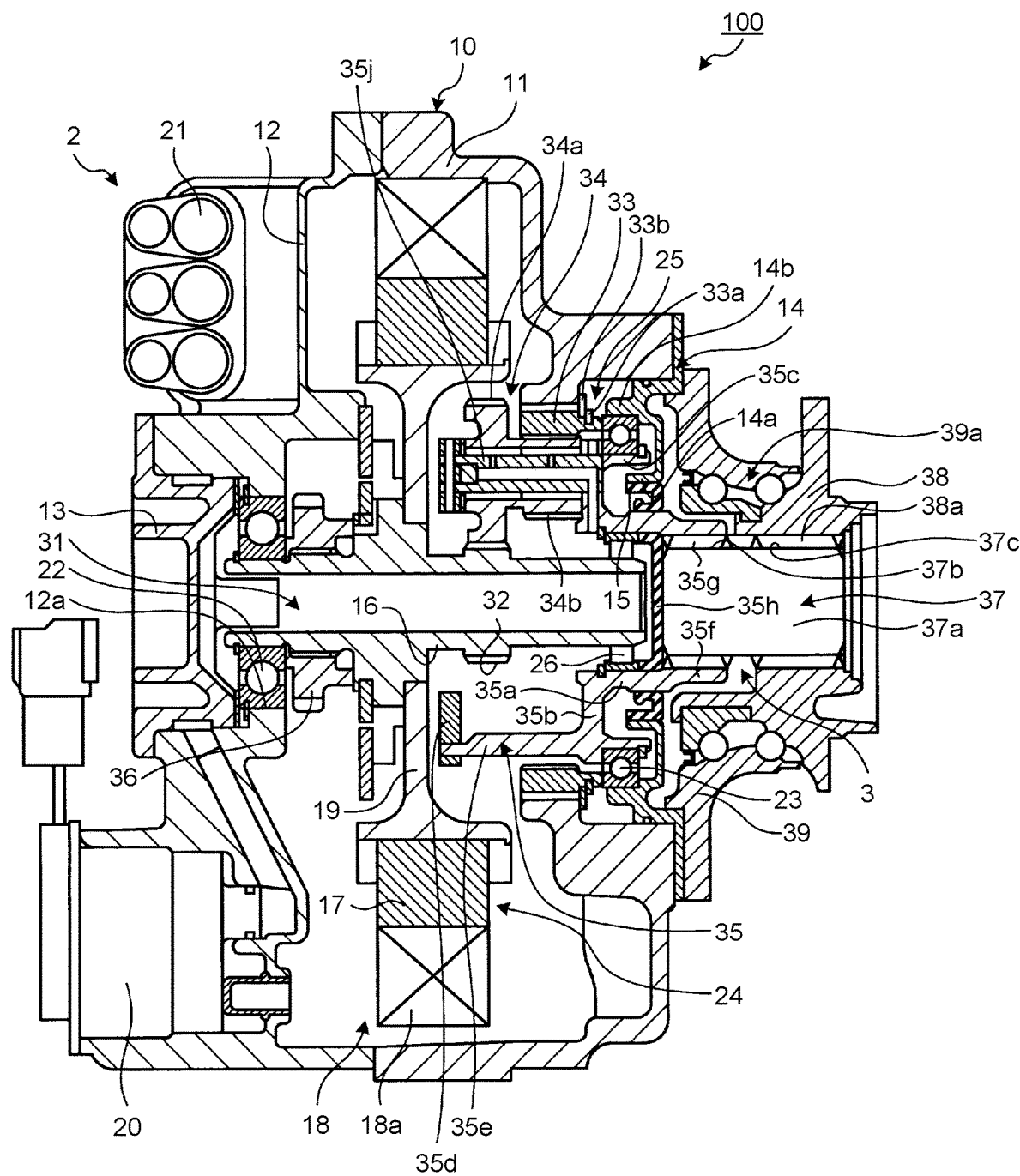
FIG. 1 is a sectional view showing one example of an in-wheel motor installed in a vehicle according to each embodiment of the present disclosure.

Hereinafter, embodiments of the present disclosure will be described with reference to the drawings. In each of the drawings in the following embodiments, the same reference numerals are added to the same or corresponding components. In addition, the present disclosure is not limited to the following embodiments.

Description will be started with an in-wheel motor installed in a wheel of a vehicle according to each embodiment of the present disclosure. FIG. 1 is a sectional view showing one example of an in-wheel motor (IWM) used in the respective embodiments of the present disclosure. The IWMs according to the embodiments re provided to four wheels of front, rear, right, and left wheels of an electric automobile, for example, and they are configured to drive these wheels.

Outline Configuration of IWM

As shown in FIG. 1, an IWM 100 includes a driving unit body 2 and a displacement absorbing mechanism 3. A driving unit body 2 functions as a driving source for traveling. The driving unit body 2 includes a motor-generator (MG) 24 and a gear train 25 in a motor case (unit case) 10. The MG 24 is a motor mechanism as a rotary electric machine in an embedded-magnet synchronous motor structure of a three-phase alternating current type, for example. The gear train 25 is a transmission mechanism including planetary gears.

The driving unit body 2 applies three-phase alternating current to a stator 18 during power running of the MG 24 so as to rotate a motor shaft 16 (input shaft) integrally having a rotor 17. The driving unit body 2 decelerates the rotation (changes the speed) of the motor shaft 16 by the gear train 25, and outputs the resultant rotation from a carrier 35 (an output-side rotary member). The driving unit body 2 increases speed of the rotation inputted from the carrier 35 at the time of regeneration by the MG 24, and rotates the motor shaft 16 and the rotor 17 at this rotation speed so as to bring the stator 18 disposed to the rotor 17 via an air gap to generate three-phase alternating current.

The motor case 10 includes a case body 11, an input-side cover 12, a cover member 13, and an output-side cover 14. The case body 11 is composed by a hollow cylindrical member whose both ends are opened, and a ring gear 33 of the gear train 25 is fixed to an inner surface of the case body 11.

The input-side cover 12 is fixed to the case body 11 with bolts (not illustrated) or the like so as to cover an opening of one end of the case body 11. The input-side cover 12 includes an opening 12a into which one end of the motor shaft 16 is inserted. An input-side bearing 22 rotatably supporting the one end of the motor shaft 16 is provided inside the opening 12a. The cover member 13 is fixed to the input-side cover 12 with bolts (not illustrated) or the like so as to cover the opening 12a of the input-side cover 12.

The output-side cover 14 is fixed to the case body 11 with bolts and others so as to cover the other end of the case body 11. The output-side cover 14 includes an opening 14a from which a small-diameter cylindrical portion 35a of the carrier 35 projects. An oil seal 15 is attached to an inner side of the opening 14a. The oil seal 15 is configured such that an inner-diameter portion thereof is in contact with an outer circumferential surface of the small-diameter cylindrical portion 35a at a predetermined seal pressure so as to prevent leakage of an oil sealed in the motor case 10. A cylindrical wall portion 14b projecting toward the ease body 11 is formed on a surface (inner surface) on the case body 11 side of the output-side cover 14. The cylindrical wall portion 14b is so provided as to surround the opening 14a. An output-side bearing 23 rotatably supporting a large-diameter cylindrical portion 35c of the carrier 35 is provided to an inner side of the cylindrical wall portion 14b.

The MG 24 is configured to include the motor shaft 16 (an input shaft), the rotor 17, and the stator 18. One end of the motor shaft 16 is inserted into the opening 12a of the input-side cover 12 of the motor case 10 so as to be rotationally supported to an inner circumferential surface of the opening 12a via the input-side bearing 22. The other end of the motor shaft 16 is inserted into the small-diameter cylindrical portion 35a of the carrier 35 of the gear train 25, and is supported by an intermediate bearing 26 interposed between the small-diameter cylindrical portion 35a and the motor shaft 16 in such a manner as to be mutually rotatable relative to each other. The rotor 17 is fitted to an outer circumference of a rotor flange 19 extending from a middle part of the motor shaft 16 in the radial direction of the motor shaft 1 in such a manner as to be integrally rotatable with the motor shaft 16. The rotor 17 is composed by stacked steel plates into which permanent magnets (not illustrated) are embedded. The stator 18 is fixed to an inner surface of the case body 11, and is disposed to the rotor 17 via an air gap. The stator 18 is configured by winding stator coils (not illustrated) around respective stator teeth 18a formed by stacked steel plate produced through punching. An axial-center oil passage 31 where the oil flows is formed at a center part of the motor shaft 16. The oil lubricates and cools necessary parts such as meshed parts of the gear train 25 and bearings, and is supplied from an oil pump (O/P) 20 provided to the input-side cover 12.

The gear train 25 is disposed in a space between the rotor flange 19 and the output-side cover 14. The gear train 25 includes a sun gear 32, a ring gear 33, stepped pinions 34, and a carrier 35. The gear train 25 is configured to decelerate and output inputted rotation from the motor shaft 16 while the sun gear 32 functions as an input, the ring gear 33 is fixed, and the carrier 35 functions as an output. The sun gear 32 as the input-side rotary member coupled to the motor shaft 16 is integrally formed with an outer circumferential surface of the motor shaft 16 so as to integrally rotate with the motor shaft 16. The ring gear 33 is rotationally fixed to the inner surface of the case body 11 through serration coupling. In the ring gear 33, a lock wheel 33a attached around an outer circumferential surface of the ring gear 33 is in contact with the case body 11 via a spacer 33b, and an end surface on the displacement absorbing mechanism 3 side of the ring gear 33 is in contact with the output-side cover 14 via the output-side bearing 23. With this configuration, the ring gear 33 is configured to be unmovable in the axial direction.

Multiple stepped pinions 34 are arranged between the sun gear 32 and the ring gear 33 so as to mesh with both the sun gear 32 and the ring gear 33, and is also rotatably supported by the carrier 35. Each stepped pinion 34 includes a large pinion 34a as a first pinion meshing with the sun gear 32, and a small pinion 34b whose diameter is set to be smaller than that of the large pinion 34a, as a second pinion meshing with the ring gear 33. Each of the sun gear 32, the ring gear 33, and the large pinion 34a and the small pinion 34b of the stepped pinion 34 is composed by a helical gear in a spiral form having teeth obliquely cut relative to the axial line. In the stepped pinion 34, a twisting direction of the teeth of the large pinion 34a and a twisting direction of the teeth of the small pinion 34b are set to be inverse to each other. In addition, the ring gear 33 and the stepped pinions 34 compose a transmission unit that changes speed of rotation of the sun gear 32.

The carrier 35 is rotated by revolution of the stepped pinions 34 revolving around the motor shaft 16, and a gear coupling shaft 37 of the displacement absorbing mechanism 3 is coupled to the carrier 35. The carrier 35 as the output-side rotary member outputs the rotation whose speed is reduced and changed by the ring gear 33 and the stepped pinions 34. The carrier 35 includes the small-diameter cylindrical portion 35a, a coupled flange portion 35b, a large-diameter cylindrical portion 35c, a support disk portion 35d, and a coupled portion 35e. The small-diameter cylindrical portion 35a is a cylindrical sleeve member whose both ends are opened, and is disposed so as to be coaxial to the motor shaft 16. A front end 35f of the small-diameter cylindrical portion 35a projects from the opening 14a of the output-side cover 14 of the motor case 10 toward the outside of the motor case 10. The motor shaft 16 is inserted via the intermediate bearing 26 into the small-diameter cylindrical portion 35a such that the motor shaft 16 and the small-diameter cylindrical portion 35a are supported so as to be relatively rotatable to each other. An inner circumferential surface of the front end 35f of the small-diameter cylindrical portion 35a is formed with a first internal teeth portion 35g, and meshes with and is coupled to a first external teeth portion 37b formed on an outer circumferential surface of a gear coupling shaft 37. Through this, the carrier 35 and the gear coupling shaft 37 are configured to be integrally rotatable to each other. A partition wall seal member 35h is disposed in an oil-tight manner at a position where the motor shaft 16 and the gear coupling shaft 37 are apart from each other.

The coupled flange portion 35b projects in the radial direction from an end on the MG 24 side of the small-diameter cylindrical portion 35a. There is formed an oil flow passage in which the oil flows inside the coupled flange portion 35b. In addition, the large-diameter cylindrical portion 35c projecting toward the displacement absorbing mechanism 3 is formed around a circumferential edge of the coupled flange portion 35b. The large-diameter cylindrical portion 35c is a cylindrical sleeve member surrounding the small-diameter cylindrical portion 35a, and is inserted into the inside of the cylindrical wall portion 14b of the output-side cover 14. The large-diameter cylindrical portion 35c is rotatably supported to the inner circumferential surface of the cylindrical wall portion 14b via the output-side bearing 23. The support disk portion 35d is in a donut-like disk shape surrounding the motor shaft 16 and opposing the coupled flange portion 35b, and is coupled to a front end of the coupled portion 35e extending from the coupled flange portion 35b toward the rotor flange 19. The stepped pinions 34 are disposed between the support disk portion 35d and the coupled flange portion 35b. The stepped pinions 34 are rotatably supported by a rotary shaft 35j extending through the coupled flange portion 35b and the support disk portion 35d. In a space between the rotor flange 19 and the input-side cover 12, a parking gear 36 that fixes the motor shaft 16 is spline-coupled to the motor shaft 16.

The displacement absorbing mechanism 3 has a function to suppress displacement and inclination of a wheel hub spindle 38 fixed to a wheel (not illustrated) from being transmitted to the MG 24 and the gear train 25 of the driving unit body 2. The displacement absorbing mechanism 3 includes a gear coupling shaft 37. The gear coupling shaft 37 couples the small-diameter cylindrical portion 35a and the wheel hub spindle 38 of the driving unit body 2 to each other in such a manner as to absorb the displacement therebetween. The wheel hub spindle 38 is rotatably supported, via a hub bearing 39a, relative to an axle case 39 fixed to an outer surface of the output-side cover 14 of the motor case 10. The displacement absorbing mechanism 3 is configured by fitting the gear coupling shaft 37, which is independently replaceable, to the small-diameter cylindrical portion 35a and the wheel hub spindle 38 so as to absorb displacement thereof and transmit driving force thereto.

The gear coupling shaft 37 is provided with the first external teeth portion 37b and a second external teeth portion 37c at respective positions on both sides of the gear coupling shaft portion 37a. The first external teeth portion 37b is serration-fitted to a first internal teeth portion 35g of the small-diameter cylindrical portion 35a so as to absorb the displacement. The second external teeth portion 37c is serration-fitted to a second internal teeth portion 38a formed on an inner circumferential surface of the wheel hub spindle 38 so as to absorb the displacement. An end surface of the gear coupling shaft 37 is in contact with the partition wall seal member 35h. The gear coupling shaft 37 is mounted together with a lubricating grease (not illustrated) in a coupling space whose whole circumference is sealed. As aforementioned, the IWM 100 used in each embodiment of the present disclosure is configured in the above manner.

First Embodiment

Figure 2:
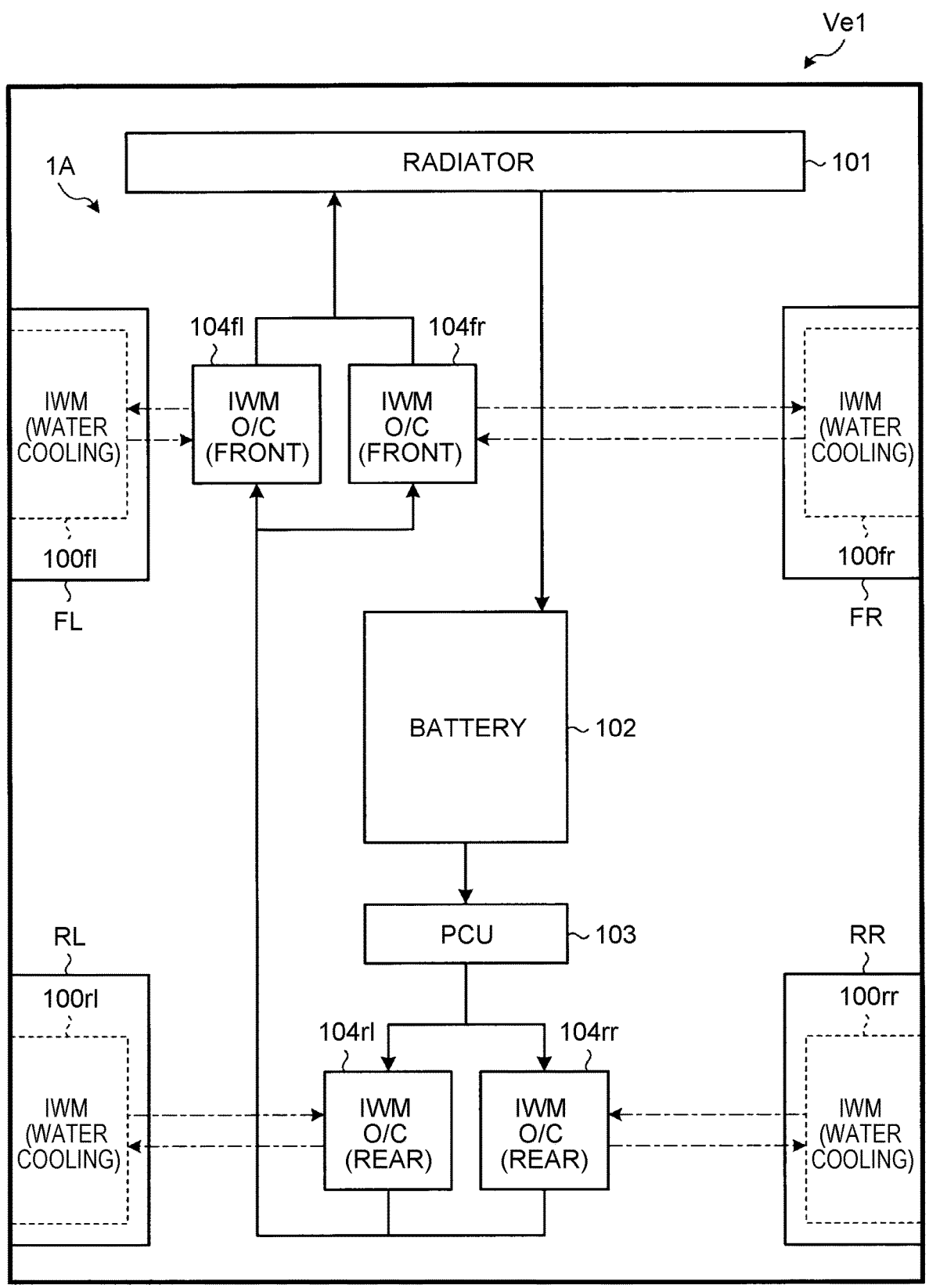
FIG. 2 is a block diagram explaining a cooling mechanism in a vehicle according to a first embodiment.

Next, the first embodiment of a cooling mechanism in a vehicle including the above configured IWM 100 will be described. FIG. 2 is a block diagram explaining the cooling mechanism in the vehicle according to the first embodiment. As shown in FIG. 2, the cooling mechanism according to the first embodiment is installed in a vehicle Ve1 as an electric vehicle including a battery. The vehicle Ve1 includes a left front wheel FL, a right front wheel FR, a left rear wheel RL, and a right rear wheel RR (hereinafter, also referred to as wheels). The wheels FL, FR, RL, RR are provided with in-wheel motor units (IWM units) 100fl, 100fr, 100rl, 100rr, respectively. The IWM unit 100fl is a unit including an in-wheel motor for a left front wheel; the IWM unit 100fr is a unit including an in-wheel motor for a right front wheel; the IWM unit 100rl is a unit including an in-wheel motor for a left rear wheel; and the IWM unit 100rr is a unit including an in-wheel motor for a right rear wheel.

The IWM units 100fl, 100fr, 100fl, 100rr respectively generate driving force or breaking force (hereinafter, regeneration breaking force) for the wheels FL, FR, RL, RR, each independently from the others. The IWM units 100fl to 100rr which are power source for travelling of the vehicle Ve1 are electrically connected to a battery 102. Each of the IWM units 100fl to 100rr is configured to be cooled by the oil circulating thereinside.

The cooling mechanism of the vehicle Ve1 includes a cooling circuit 1A as a cooling medium circuit. The cooling circuit 1A includes a radiator 101, the battery 102, a power control unit (hereinafter, PCU) 103, and oil coolers for the in-wheel motors (IWM oil coolers) 104fl, 104fr, 104rl, 104rr. The IWM oil cooler 104fl composes a heat exchanger for the left front wheel; the IWM oil cooler 104fr composes a heat exchanger for the right front wheel; the IWM oil cooler 104rl composes a heat exchanger for the right rear wheel; and the IWM oil cooler 104rr composes a heat exchanger for the right rear wheel. The IWM oil coolers 104fl, 104fr as the heat exchangers for the front wheels are disposed at frontward positions in the front-rear direction of the vehicle Ve1. The IWM oil coolers 104rl, 104rr as the heat exchangers for the rear wheels are disposed at rearward positions in the front-rear direction of the vehicle Ve1.

The radiator 101 as a cooling device is a heat exchanger disposed at a frontward position in the vehicle Ve1, and is of a so-called air-cooling type configured to cool the coolant through heat exchange with the air introduced from the outside. The coolant (LLC) as a cooling medium is sent out by a water pump (not illustrated) and circulates inside the cooling circuit 1A. A position where the water pump is disposed is set at any position in the cooling circuit 1A, and any number of water pumps or a single water pump may be disposed. The battery 102 is a dischargeable battery that supplies electric power to the IWM units 100*fl* to 100*fr*. The battery 102 is configured to be cooled by the coolant circulating inside the cooling circuit 1A, and flowing via the inside of the battery 102.

The PCU 103 is a device to control the battery 102 and the IWM units 100*fl* to 100*rr*. The PCU 103 converts DC current outputted from the battery 102 into AC current, and supplies the resultant AC current to the motor. The PCU 103 includes at least an inverter, and may further include a converter. The PCU 103 as a controller having an inverter is provided with an inverter case accommodating electronic devices such as an inverter (none are illustrated) therein. The inverter and the converter serve as heating sources of the PCU 103, and the inverter and the converter of the PCU 103 are configured to be cooled by the coolant circulating inside the cooling circuit 1A and flowing via the inside of the PCU 103.

The IWM oil coolers 104*fl* to 104*rr* are oil coolers carrying out heat-exchange between the oil whose temperature is increased after cooling the corresponding IWM units 100*fl* to 100*rr* and the coolant circulating in the cooling circuit 1A. That is, the IWM units 100*fl* to 100*rr* according to the first embodiment are in-wheel motors of a water-cooling type in which the oil after cooling the IWM units 100*fl* to 100*rr* is cooled by the coolant. The IWM oil coolers 104*fl* to 104*rr* are respectively provided with oil pumps for circulation (not illustrated) that circulate the oil between the IWM oil coolers 104*fl* to 104*rr* and the IWM units 100*fl* to 100*rr*. The oil pumps for circulation may be provided to the IWM units 100*fl* to 100*rr*, or to oil circulation flow passages between the IWM oil coolers 104*fl* to 104*rr* and the corresponding IWM units 100*fl* to 100*rr*. In the following drawings, arrows indicated by one dot chain lines show oil flows.

The circulation of the coolant inside the cooling circuit 1A according to the first embodiment is carried out as follows. That is, the coolant after being cooled by the radiator 101 is supplied to the battery 102 so as to cool the battery 102. If the temperature of the coolant is higher than the temperature of the battery 102, the battery 102 is warmed up by the coolant. The coolant is heated or cooled depending on the temperature of the battery 102.

Subsequently, the coolant is supplied to the PCU 103. While the PCU 103 is cooled by the coolant, the coolant is heated. After cooling the battery 102 and the PCU 103 in turn, the coolant is supplied in parallel to the IWM oil coolers 104*rl*, 104*rr* for the respective rear wheels. The supplied coolant is subjected to heat exchange with the oil flowing through the inside of the IWM oil coolers 104*rl*, 104*rr* so as to be increased in temperature. The coolant after flowing via the IWM oil coolers 104*rl*, 104*rr* is then supplied in parallel to the IWM oil coolers 104*fl*, 104*fr* for the respective front wheels. The supplied coolant is heat-exchanged with the oil passing through the inside of the IWM oil coolers 104*fl*, 104*fr* so as to be increased in temperature.

The coolant, supplied from the radiator 101, passing via the battery 102, the PCU 103, the IWM oil coolers 104*rl*, 104*rr* on the rear wheel side, and the IWM oil coolers 104*fl*, 104*fr* on the front wheel side in turn so as to be increased in temperature, is then returned to the radiator 101. In the radiator 101, the coolant increased in temperature is heat-exchanged with the atmospheric air introduced from the outside so as to be cooled. The coolant can be brought to flow via only one of the battery 102 and the PCU 103. That is, the coolant is circulated at least from the radiator 101 through at least one of the battery 102 and the PCU 103, and also through the IWM oil coolers 104*fl* to 104*rr*.

As aforementioned, according to the first embodiment, the coolant cooled in the radiator 101 is circulated through the battery 102, the PCU 103, the IWM oil coolers 104*rl*, 104*rr*, and the IWM oil coolers 104*fl*, 104*fr* in turn, and thereafter is returned to the radiator 101. With this configuration, it becomes unnecessary to provide the respective heating sources of the battery 102, the PCU 103, and the IWM oil coolers 104*fl* to 104*rr* with horses and water pumps for the cooling. With this configuration, it is possible to reduce the number of coolant horses and the number of water pumps used for supplying the coolant to the respective heating sources, to thereby simplify the cooling mechanism of the vehicle Ve1. Accordingly, with respect to the cooling mechanism of the vehicle Ve1, it is possible to attain reduction in cost and weight.

In the first embodiment, since the coolant supplied from the radiator 101 is brought to flow through devices highly required to be cooled, or devices having lower target cooling temperatures, such as the battery 102 and the PCU 103, in turn to thereby secure the entire cooling performance while simplifying the cooling mechanism. In addition, it is possible to secure the cooling performance while simplifying the cooling mechanism, to thereby promote size reduction of the radiator 101.

Second Embodiment

Figure 3:
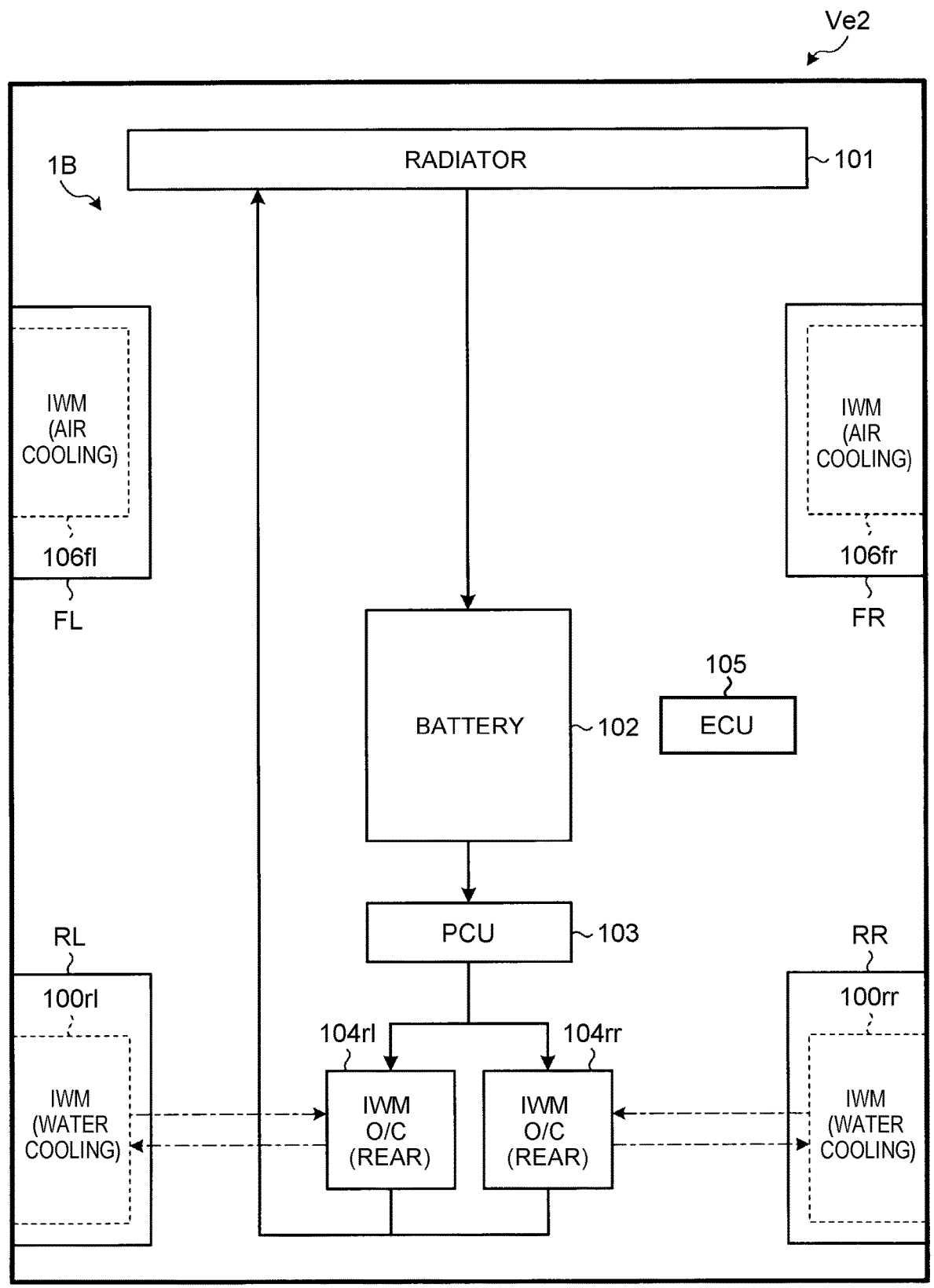
FIG. 3 is a block diagram explaining a cooling mechanism in a vehicle according to a second embodiment.

Next, a cooling mechanism in a vehicle according to the second embodiment of the present disclosure will be described. FIG. 3 is a block diagram explaining the cooling mechanism in a vehicle Ve2 according to the second embodiment. As shown in FIG. 3, the cooling mechanism of the vehicle Ve2 includes a cooling circuit 1B.

In the cooling circuit 1B, different from the first embodiment, each of the IWM units 106*fl*, 106*fr* is of an air cooling type, and there are provided no IWM oil coolers as heat exchangers for the front wheels FL, FR. Here, that the IWM units 106*fl*, 106*fr* are of an air cooling type means cooling schemes employing various cooling types except for the water cooling type using coolant. Specifically, there can be listed such a scheme that the motor cases 10 of the IWM units 106*fl*, 106*fr* are provided with cooling fins or the like, and the IWM units 106*fl*, 106*fr* are cooled through the cooling fins or the like. There may also be employed such a scheme that the IWM units 106*fl*, 106*fr* are cooled by an oil or the like, and the oil increased in temperature after the cooling is cooled by the outside air introduced from the outside of the vehicle Ve2.

In cooling circuit 1B, the coolant cooled by the radiator 101 is brought to flow through the battery 102, the PCU 103, and the IWM oil coolers 104*rl*, 104*rr* on the rear wheel side in turn, and thereafter is returned to the radiator 101 to be circulated. The other configurations are the same as those of the first embodiment.

According to the second embodiment, the coolant cooled by the radiator 101 is brought to flow through the battery 102, the PCU 103, and the IWM oil coolers 104*rl*, 104*rr* on the rear wheel side in turn, and thereafter is returned to the radiator 101. Through this, the same effect as that of the first embodiment can be attained. Since the front wheels FL, FR are more likely to be steered wheels to be steered, there are provided no horses and no W/Ps for the coolant between the cooling circuit 1B and the IWM units 106*fl*, 106*fr*, to thereby secure a space used for installing various equipment for the steering therein. Through this, it is possible to further simplify the configuration of the cooling circuit, and to further attain reduction in cost and weight of the vehicle Ve2, compared with the first embodiment.

Here, a variation of the second embodiment will be described. For example, in a part on the front wheel side of the vehicle Ve2, since it is necessary to install various components for the steering, it is sometimes difficult to provide piping for configuring the flow passages of the coolant and the oil on this front wheel side. In such a case, as aforementioned, it can be considered that the IWM units 106*fl*, 106*fr* on the front wheel side are set to be of an air cooling type, and the IWM units 100*fl*, 100*rr* on the rear wheel side are set to be of a water cooling type. To the contrary, if the steering is carried out on the rear wheel side, it can be considered that the IWM units on the front wheel side are set to be of a water cooling type, and the IWM units on the rear wheel side are set to be of an air cooling type.

If the front wheels are configured to be steered wheels, for example, based on the temperatures of the IWM units 106*fl*, 106*fr*, 100*rl*, 100*rr*, it is possible to change a distribution between the driving force of the IWM units 106*fl*, 106*fr* for the front wheels and the driving force of the IWM units 100*rl*, 100*rr* for the rear wheels by an electronic control unit (ECU) 105 of the vehicle Ve2. Alternatively, the ECU 105 can derive the temperatures of the IWM units 106*fl*, 106*fr*, 100*rl*, 100*rr* from various parameters, and control change of the distribution between the driving force of the IWM units 106*fl*, 106*fr* and the driving force of the IWM units 100*rl*, 100*rr*. By changing the distribution between the driving force of the IWM units 106*fl*, 106*fr* on the front wheel side and the driving force of the IWM units 100*rl*, 100*rr* on the rear wheel side, it is possible to change a generated heat amount of the IWM units 106*fl*, 106*fr* and a generated heat amount of the IWM units 100*rl*, 100*rr*. Through this, it is possible to maintain the respective temperatures of the in-wheel motors on the front and the rear sides to be substantially equal and uniform to each other, to thus enhance reliability on the IWM units 106*fl*, 106*fr* and on the IWM units 100*rl*, 100*rr*.

Third Embodiment

Figure 4:
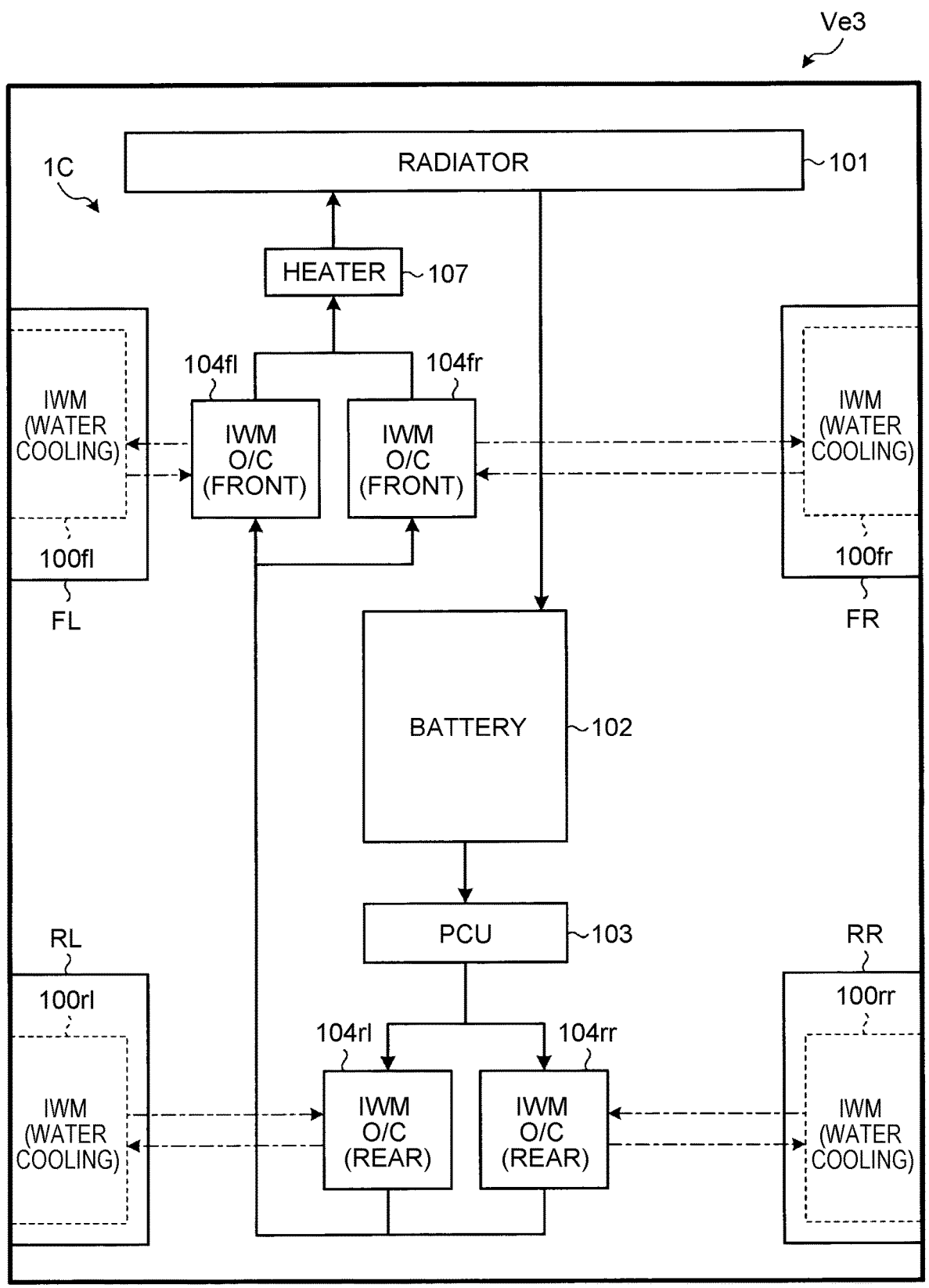
FIG. 4 is a block diagram explaining a cooling mechanism in a vehicle according to a third embodiment.

Next, a cooling mechanism in a vehicle according to the third embodiment of the present disclosure will be described. FIG. 4 is a block diagram explaining the cooling mechanism in a vehicle Ve3 according to the third embodiment. As shown in FIG. 4, the cooling mechanism of the vehicle Ve3 includes a cooling circuit 1C.

In the cooling circuit 1C, along the flowing direction of the coolant, a heater 107 is provided at a position located downstream of the IWM oil coolers 104*fl*, 104*fr* on the front wheel side and upstream of the radiator 101. Here, an example of the heater 107 as air heating means may include a water heater, for example, configured to use the coolant increased in temperature as a heating source, and to have a heater core (not illustrated) that carries out heat exchange between the coolant and the air for air conditioning. The temperature of the coolant increased by the battery 102, the PCU 103, and the IWM oil coolers 104*fl* to 104*rr* is decreased by the heater 107. In the heater 107, the air for the air conditioning increased in temperature by the heater core can be introduced into a cabin (vehicle cabin) as warm wind.

In the cooling circuit 1C, the coolant cooled by the radiator 101 is brought to flow through the battery 102, the PCU 103, the IWM oil coolers 104*rl*, 104*rr* on the rear wheel side, the IWM oil coolers 104*fl*, 104*fr* on the front wheel side, and the heater 107 in turn, and thereafter is returned to the radiator 101 to be circulated. The other configurations are the same as those of the first embodiment.

According to the third embodiment, the coolant cooled by the radiator 101 is brought to flow through the battery 102, the PCU 103, the IWM oil coolers 104*rl*, 104*rr* on the rear wheel side, the IWM oil coolers 104*fl*, 104*fr* on the front wheel side in turn, and thereafter is supplied to the heater 107 to be returned to the radiator 101. With this configuration, the same effect as that of the first embodiment can be attained. By providing the heater 107 at a position located downstream of the IWM oil coolers 104*fl*, 104*fr* and upstream of the radiator 101, the heat of the battery 102, the PCU 103, and the IWM units 100*fl* to 100*rr* can be introduced as warm wind into the cabin of the vehicle Ve3. With this configuration, in the case in which an electric heater is additionally provided, its output can be reduced, thus greatly improving electrical efficiency, and increasing a cruising distance of the vehicle Ve3.

Fourth Embodiment

Figure 5:
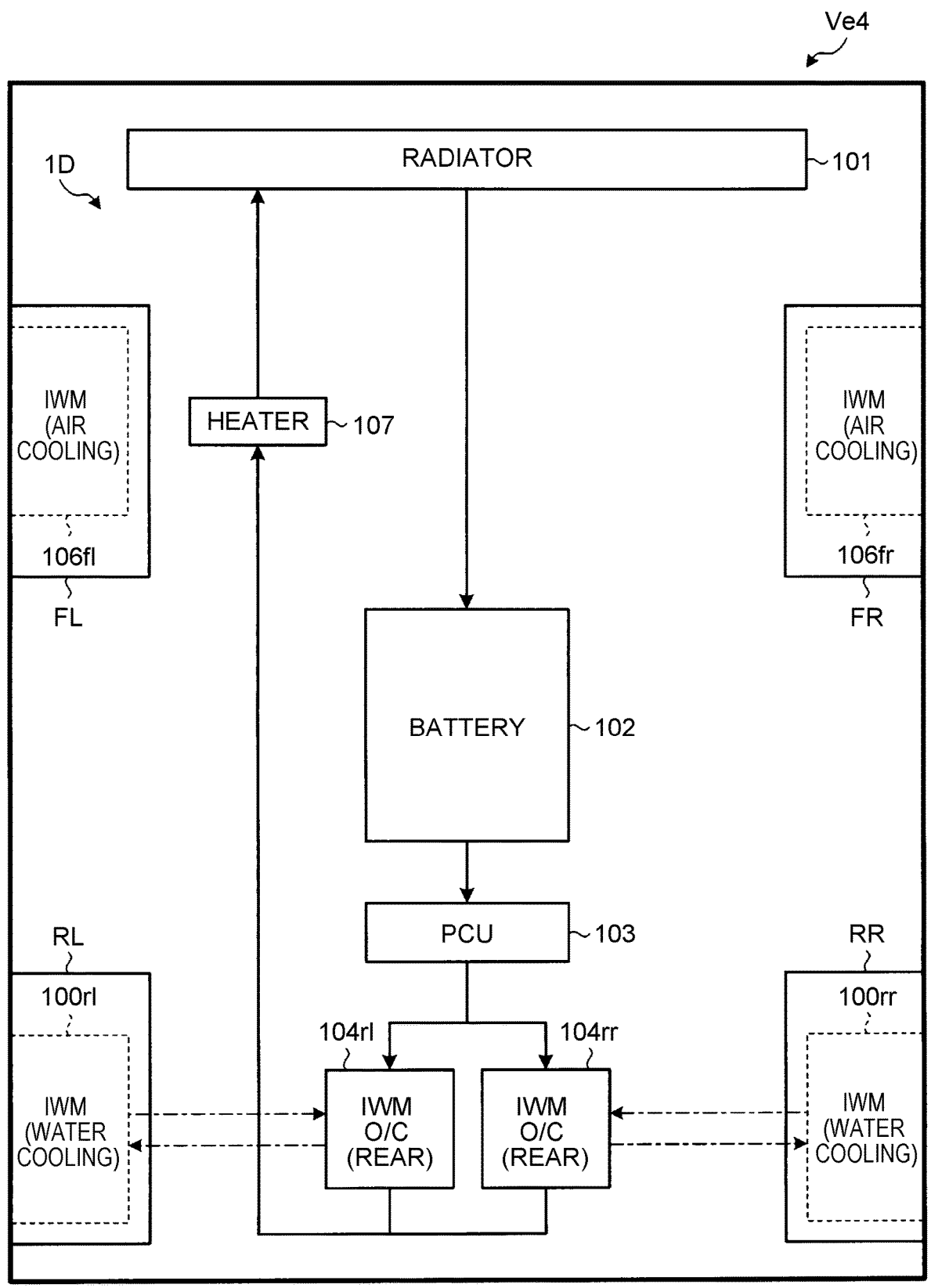
FIG. 5 is a block diagram explaining a cooling mechanism in a vehicle according to a fourth embodiment.

Next, a cooling mechanism in a vehicle according to the fourth embodiment of the present disclosure will be described. FIG. 5 is a block diagram explaining the cooling mechanism in the vehicle Ve4 according to the fourth embodiment. As shown in FIG. 5, the cooling mechanism of the vehicle Ve4 includes a cooling circuit 1D.

In the cooling circuit 1D, different from the second embodiment, the heater 107 is provided at a position located downstream of the IWM oil coolers 104*rl*, 104*rr* on the rear wheel side and upstream of the radiator 101, along the flowing direction of the coolant. The coolant increased in temperature by the battery 102, the PCU 103, and the IWM oil coolers 104*rl*, 104*rr* is decreased in temperature by the heater 107. In the cooling circuit 1D, the coolant cooled by the radiator 101 is brought to flow through the battery 102, the PCU 103, the IWM oil coolers 104*rl*, 104*rr*, and the heater 107 in turn, and is then returned to the radiator 101 to be circulated. The other configurations are the same as those of the second embodimen.

According to the fourth embodiment, the front wheels FL, FR are respectively provided with the IWM units 106*fl*, 106*fr* of the air cooling type, to thereby attain the same effect as that of the second embodiment. In addition, since the heater 107 is provided at a position located downstream of the IWM oil coolers 104*rl*, 104*rr* on the rear wheel side and upstream of the radiator 101, heat of the battery 102, the PCU 103, and the IWM units 100*rl*, 100*rr* can be introduced as warm wind through the heater 107 into the cabin of the vehicle Ve4. With this configuration, the same effect as that of the third embodiment can be attained.

Fifth Embodiment

Figure 6:
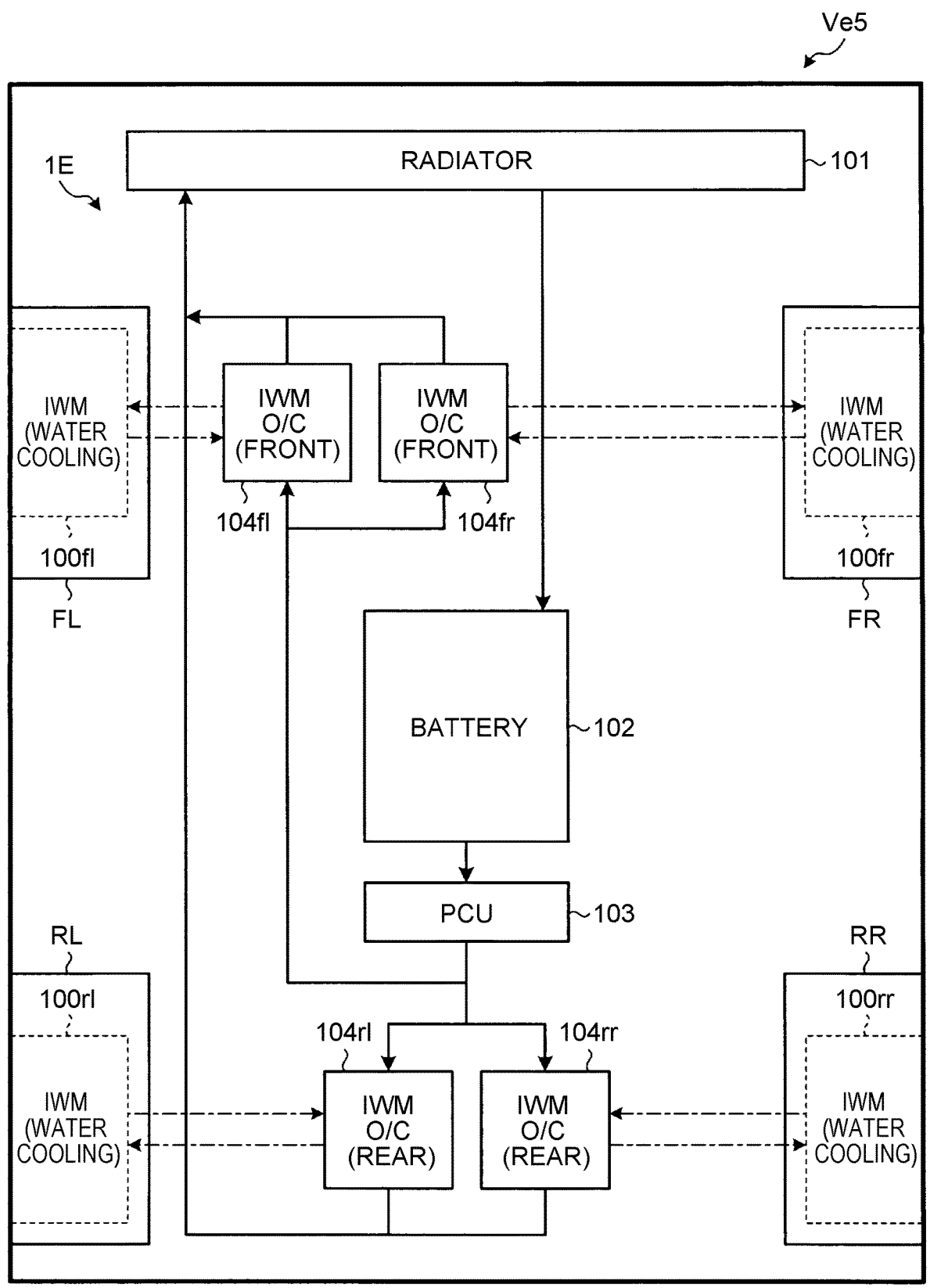
FIG. 6 is a block diagram explaining a cooling mechanism in a vehicle according to a fifth embodiment.

Next, a cooling mechanism in a vehicle according to the fifth embodiment of the present disclosure will be explained. FIG. 6 is a block diagram explaining the cooling mechanism in a vehicle Ve5 according to the fifth embodiment. As shown in FIG. 6, the cooling mechanism of the vehicle Ve5 includes a cooling circuit 1E.

In the cooling circuit 1E, different from the first embodiment, the flow passage of the coolant as a cooling-medium flow passage branches at a position located downstream of the PCU 103 and upstream of the IWM oil coolers 104*rl*, 104*rr* on the rear wheel side, along the flowing direction of the coolant. The flow passage branching at the position located downstream of the PCU 103 and upstream of the IWM oil coolers 104*rl*, 104*rr* is connected to the IWM oil coolers 104*fl*, 104*fr* on the front wheel side. That is, it is configured that the coolant flowing via the PCU 103 is supplied to the IWM oil coolers 104*rl*, 104*rr* on the rear wheel side and to the IWM oil coolers 104*fl*, 104*fr* on the front wheel side in parallel. In addition, the coolant flowing via the IWM oil coolers 104*rl*, 104*rr* on the rear Wheel side joins with the coolant flowing via the IWM oil coolers 104*fl*, 104*fr* on the front wheel side, and is then supplied to the radiator 101. The coolant flowing via the IWM oil coolers 104*rl*, 104*rr* may not join with the coolant flowing via the IWM oil coolers 104*fl*, 104*fr*, but may be supplied to the radiator 101. The other configurations are the same as those of the first embodiment.

According to the fifth embodiment, the coolant cooled by the radiator 101 is brought to flow via the battery 102 and the PCU 103 in turn, and thereafter is supplied to the IWM oil coolers 104*rl*, 104*rr* on the rear wheel side and the IWM oil coolers 104*fl*, 104*fr* on the front wheel side in parallel, and is eventually returned to the radiator 101 to be circulated. With this configuration, the same effect as that of the first embodiment can be attained. The flow passage of the coolant is set to branch at a position located downstream of the PCU 103 so as to supply the coolant flowing via this PCU 103 to the IWM oil coolers 104*fl*, 104*fr* on the front wheel side, not via the IWM oil coolers 104*rl*, 104*rr* on the rear wheel side. With this configuration, compared with the first and the third embodiments, the temperature of the coolant supplied to the IWM oil coolers 104*fl*, 104*fr* on the front wheel side can be lower than those in the first and the third embodiment, and thus it is possible to enhance the cooling performance in the IWM oil coolers 104*fl*, 104*fr* on the front wheel side, and also enhance reliability on the cooling mechanism of the vehicle Ve5.

Sixth Embodiment

Figure 7:
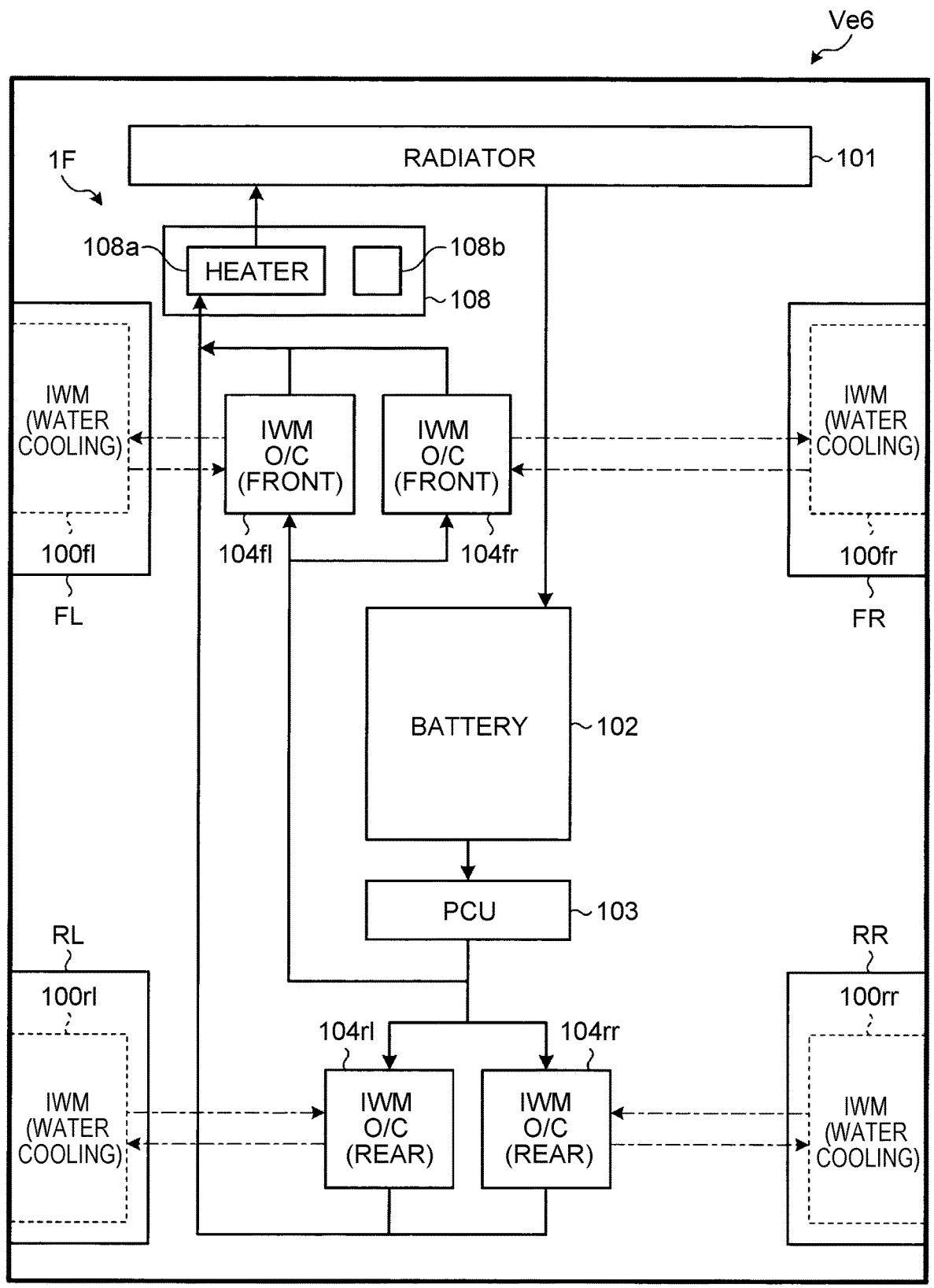
FIG. 7 is a block diagram explaining a cooling mechanism in a vehicle according to a sixth embodiment.

Next, a cooling mechanism in a vehicle according to the sixth embodiment of the present disclosure will be described. FIG. 7 is a block diagram explaining the cooling mechanism in a vehicle Ve6 according to the sixth embodiment. As shown in FIG. 7, the cooling mechanism of the vehicle Ve6 includes a cooling circuit 1F.

In the cooling circuit 1F, different from the fifth embodiment, a heater unit 108 is provided at a position located upstream of the radiator 101 and downstream of the IWM oil coolers 104*fl*, 104*fr* on the front wheel side and the IWM oil coolers 104*rl*, 104*rr* on the rear wheel side, along the flowing direction of the coolant. The heater unit 108 includes a water heater 108*a* which is the same as that of the above-described heater 107, and an electric heater 108*b*. The heater unit 108 is configured such that when introduction of air for air conditioning (warm wind) whose temperature is increased by the water heater 108*a* into the cabin is delayed, the air for the air conditioning rapidly heated by an electric heater 108*b* can preferentially be supplied to the cabin. The other configurations are the same as those of the first and the fifth embodiments.

According to the sixth embodiment, the coolant cooled by the radiator 101 is brought to flow through the battery 102 and the PCU 103 in turn, and thereafter is supplied to the IWM oil coolers 104*rl*, 104*rr* on the rear wheel side and the IWM oil coolers 104*fl*, 104*fr* on the front wheel side in parallel. With this configuration, the same effects as those of the first and the fifth embodiments can be attained. The coolant flowing via the IWM oil coolers 104*fl* to 104*rr* is supplied to the water heater 108*a* of the heater unit 108, to thereby attain the same effects as those of the third and the fourth embodiments.

Seventh Embodiment

Figure 8:
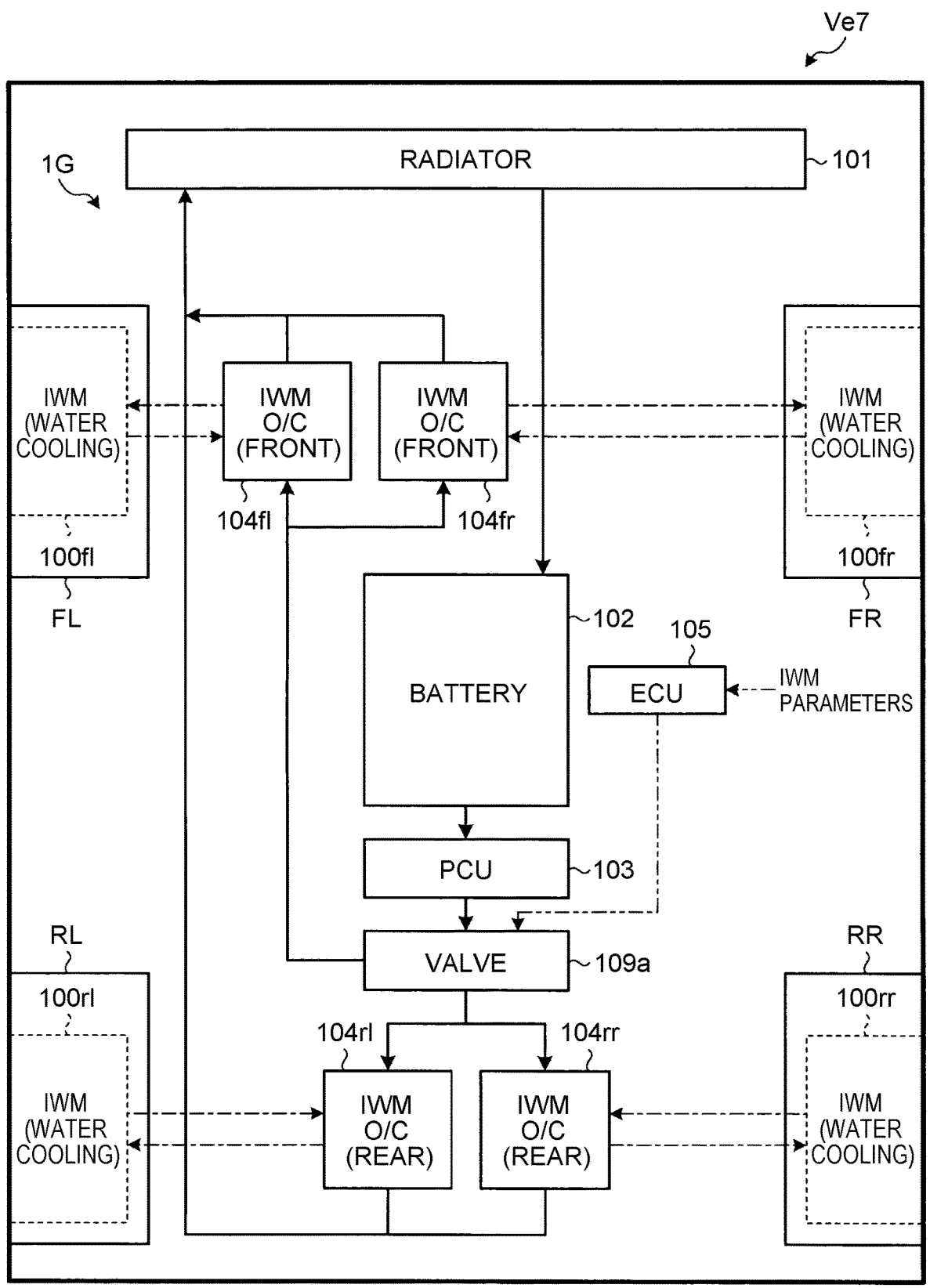
FIG. 8 is a block diagram explaining a cooling mechanism in a vehicle according to a seventh embodiment.

Next, a cooling mechanism in a vehicle according to the seventh embodiment of the present disclosure will be described. FIG. 8 is a block diagram explaining the cooling mechanism in a vehicle Ve7 according to the seventh embodiment. As shown in FIG. 8, the cooling mechanism of the vehicle Ve7 includes a cooling circuit 1G.

In the cooling circuit 1G, different from the fifth embodiment, a valve 109*a* is provided at a branching point located downstream of the PCU 103 along the flowing direction of the coolant, the branching point being located between the flow passage toward the IWM oil coolers 104*rl*, 104*rr* on the rear wheel side and the flow passage toward the IWM oil coolers 104*fl*, 104*fr* on the front wheel side. A valve 109*a* as a distribution regulating valve is configured to regulate, by the ECU 105, a valve aperture that defines a distribution proportion between flow rates at at least two outflow parts where the coolant flows out.

The ECU 105 is supplied with, as IWM parameters, at least one parameter regarding outputted driving force and power, amount of current, the number of rotations, amount of power generation, and a temperature, which contribute to heat generation, in each of the IWM units 100*fl* to 100*rr*. The ECU 105 controls a valve aperture of a valve 109*a* based on the inputted IWM parameters. The ECU 105 may be configured to introduce at least one parameter regarding driving force, power, amount of current, the number of rotations, amount of power generation, and a temperature, which contribute to heat generation, from inputted parameters other than the IWM parameters so as to control the valve aperture of the valve 109*a* based on the introduced parameters. Through the control on the valve 109*a* by the ECU 105, it is possible to regulate a distribution of the flow rate of the coolant passing via the PCU 103 into a flow rate of the coolant toward the IWM oil coolers 104*rl*, 104*rr* on the rear wheel side, and into a flow rate of the coolant toward the IWM oil coolers 104*fl*, 104*fr* on the front wheel side. That is, the flow-rate distribution of the coolant is changed between the IWM oil coolers 104*fl*, 104*fr* and the IWM oil coolers 104*rl*, 104*rr* so as to configure the cooling performance to be changeable.

Specifically, it is supposed to generate a difference between the driving force by the IWM units 100*fl*, 100*fr* on the front wheel side and the driving force by the IWM units 100*rl*, 100*rr* on the rear wheel side. For example, the driving force by the IWM units 100*fl*, 100*fr* on the front wheel side is set to be greater than the driving force by the IWM units 100*rl*, 100*rr* on the rear wheel side. Due to this, a generated heat amount of the IWM units 100*fl*, 100*fr* on the front wheel side becomes greater than a generated heat amount of the IWM units 100*rl*, 100*rr* on the rear wheel side. Consequently, the temperatures of the IWM units 100*fl*, 100*fr* become greater than the temperatures of the IWM units 100*rl*, 100*rr*. In this case, the ECU 105 controls the valve aperture of the valve 109*a* so as to increase the flow rate of the coolant toward the IWM oil coolers 104*fl*, 104*fr* on the front wheel side, and also to decrease the flow rate of the coolant toward the IWM oil coolers 104*rl*, 104*rr* on the rear wheel side. Through this control, the temperature of the IWM units 100*fl*, 100*fr* on the front wheel side can rapidly be lower than the temperature of the IWM units 100*rl*, 100*rr* on the rear wheel side. Hence, it is possible to control the respective temperatures of the IWM units 100*fl* to 100*rr* to be substantially equal to each other, to thereby enhance reliability on the cooling mechanism of the vehicle Ve7. The other configurations are the same as those of the fifth embodiment.

According to the seventh embodiment, the coolant cooled by the radiator 101 is brought to flow via the battery 102 and the PCU 103 in turn, and thereafter is supplied to the IWM oil coolers 104*rl*, 104*rr* on the rear wheel side and to the IWM oil coolers 104*fl*, 104*fr* on the front wheel side in parallel. Through this, the same effects as those of the first and the fifth embodiments can be attained. In addition, it is possible to regulate, by the valve 109*a*, the distribution between the flow rate of the coolant toward the IWM oil coolers 104*rl*, 104*rr* on the rear wheel side and the flow rate of the coolant toward the IWM oil coolers 104*fl*, 104*fr* on the front wheel side. Accordingly, even when a difference in temperature is generated between the IWM units 100*fl*, 100*fr* on the front wheel side and the IWM units 100*rl*, 100*rr* on the rear wheel side, the respective temperatures of the IWM units 100*fl* to 100*rr* can be controlled to be generally equal to each other.

Eighth Embodiment

Figure 9:
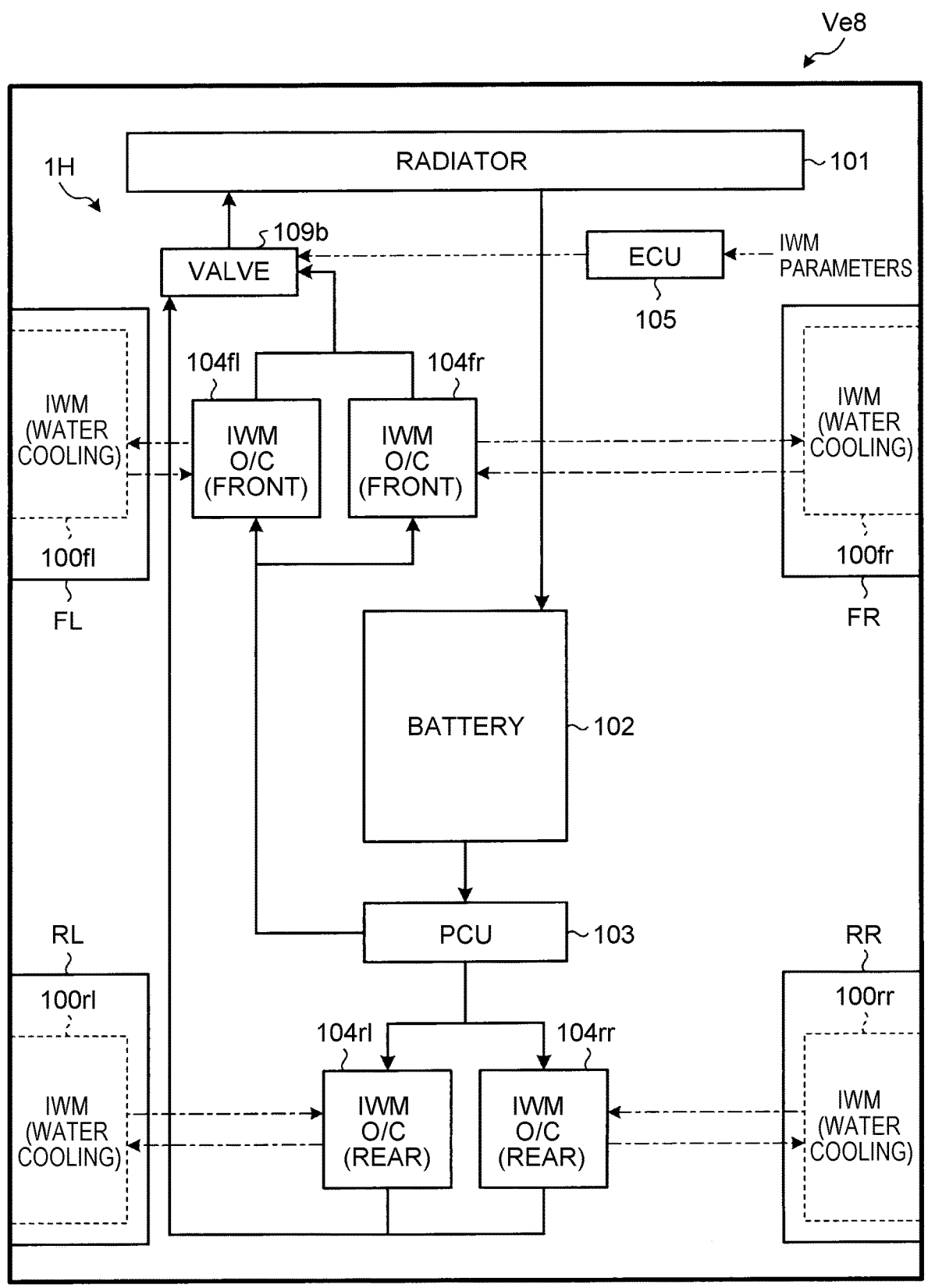
FIG. 9 is a block diagram explaining a cooling mechanism in a vehicle according to an eighth embodiment.

Next, a cooling mechanism in a vehicle according to the eighth embodiment of the present disclosure will be described. FIG. 9 is a block diagram explaining the cooling mechanism in a vehicle Ve8 according to the eighth embodiment. As shown in FIG. 9, the cooling mechanism of the vehicle Ve8 includes a cooling circuit 1H.

In the cooling circuit 1H, different from the fifth and the seventh embodiments, there is provided a valve 109*b* at a position located downstream of the IWM oil coolers 104*fl*, 104*fr* on the front wheel side and downstream of the IWM oil coolers 104*rl*, 104*fr* on the rear wheel side, and also upstream of the radiator 101, along the flowing direction of the coolant. The valve 109*b* is configured to regulate, by the ECU 105, a valve aperture that defines a distribution proportion between flow rates at at least two inflow parts where the coolant flows in.

The ECU 105 controls the valve aperture of the valve 109*b* based on the inputted IWM parameters. Through the control on the valve 109*b* by the ECU 105, the distribution between the flow rate of the coolant flowing from the IWM oil coolers 104*rl*, 104*fr* on the front wheel side into the valve 109*b* and the flow rate of the coolant flowing from the IWM oil coolers 104*rl*, 104*rr* on the rear wheel side into the valve 109*b* is controlled. Through this control on the distribution, the flow rate of the coolant supplied from the PCU 103 toward the IWM oil coolers 104*fl*, 104*fr* on the front wheel side and the flow rate of the coolant supplied from the PCU 103 toward the IWM oil coolers 104*rl*, 104*rr* on the rear wheel side are controlled. The other configurations are the same as those of the fifth and the seventh embodiments.

According to the eighth embodiment, the coolant cooled by the radiator 101 is brought to flow via the battery 102 and the PCU 103 in turn, and thereafter is supplied to the IWM oil coolers 104*rl*, 104*rr* on the rear wheel side and the IWM oil coolers 104*fl*, 104*fr* on the front wheel side in parallel, and is then returned via the valve 109*b* to the radiator 101 to be circulated. Through this, the same effects as those of the first and the fifth embodiments can be attained. In addition, it is possible to regulate, by the valve 109*b*, the distribution between the flow rate of the coolant toward the IWM oil coolers 104*rl*, 104*rr* on the rear wheel side and the flow rate of the coolant toward the IWM oil coolers 104*fl*, 104*fr* on the front wheel side; therefore, it is possible to attain the same effect as that of the seventh embodiment.

Ninth Embodiment

Figure 10:
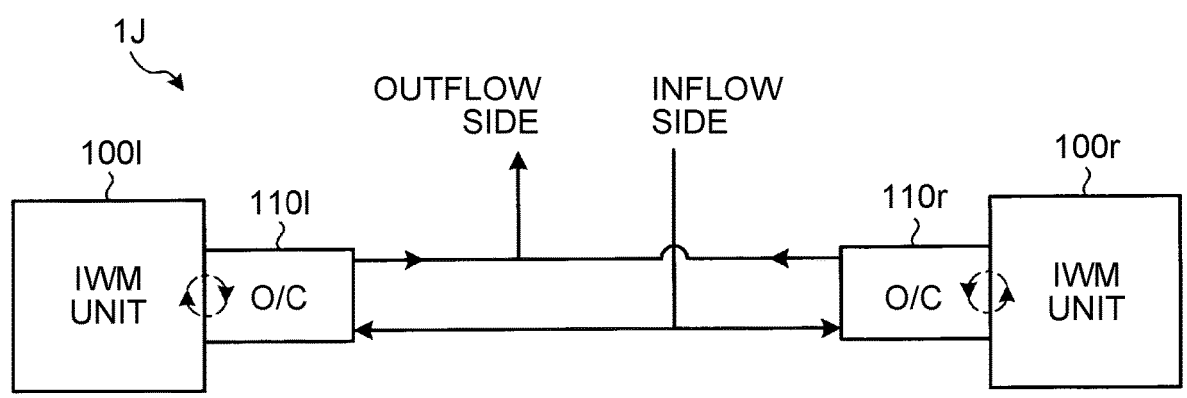
FIG. 10 is a block diagram explaining a cooling mechanism according to a ninth embodiment.

Next, a cooling mechanism in a vehicle according to the ninth embodiment of the present disclosure will be described. FIG. 10 is a block diagram explaining the cooling mechanism according to the ninth embodiment. As shown in FIG. 10, the cooling mechanism according to the ninth embodiment includes a cooling circuit 1J.

As shown in FIG. 10, in the cooling circuit 1J according to the ninth embodiment, different from the first to the eighth embodiments, an IWM oil cooler 110*l* as a heat exchanger for a left wheel is directly mounted to an IWM unit 100*l* as an in-wheel motor for a left wheel. In the IWM oil cooler 110*l*, the cooling oil is circulated between the IWM unit 100*l* and the IWM oil cooler 110*l*. The IWM unit 100*l* for the left wheel is at least one of the IWM units 100*fl* and 100*rl*. In the meantime, an IWM oil cooler 110*r* as a heat exchanger for a right wheel is directly mounted to an IWM unit 100*r* as an in-wheel motor for a right wheel. In the IWM oil cooler 110*r*, the cooling oil is circulated between the IWM unit 100*r* and the IWM oil cooler 110*r*. The IWM unit 100*r* for the right wheel is at least one of the IWM units 100*fr* and 100*rr*.

In FIG. 10, the inflow side is a side where the coolant flows in, and the coolant flowing in via the PCU 103, the valve 109*a*, and others is divided into two so as to be respectively supplied to the IWM oil coolers 110*l* and 110*r*. In the meantime, the outflow side is a side where the coolant flows out, and the coolant flowing out from the IWM oil coolers 110*l*, 110*r* is supplied to the heater 107, the heater unit 108, the valve 109*b*, or the like, and is eventually returned to the radiator 101. The other configurations are the same as those of the first to the eighth embodiments.

According to the ninth embodiment, the IWM oil coolers 110*l*, 110*r* are directly mounted to the IWM units 100*l*, 100*r*, respectively, to thereby reduce the piping allowing the oil to flow, and simplify the piping for the oil. Accordingly, it is possible to attain reduction in cost and weight of the vehicle.

Tenth Embodiment

Figure 11:
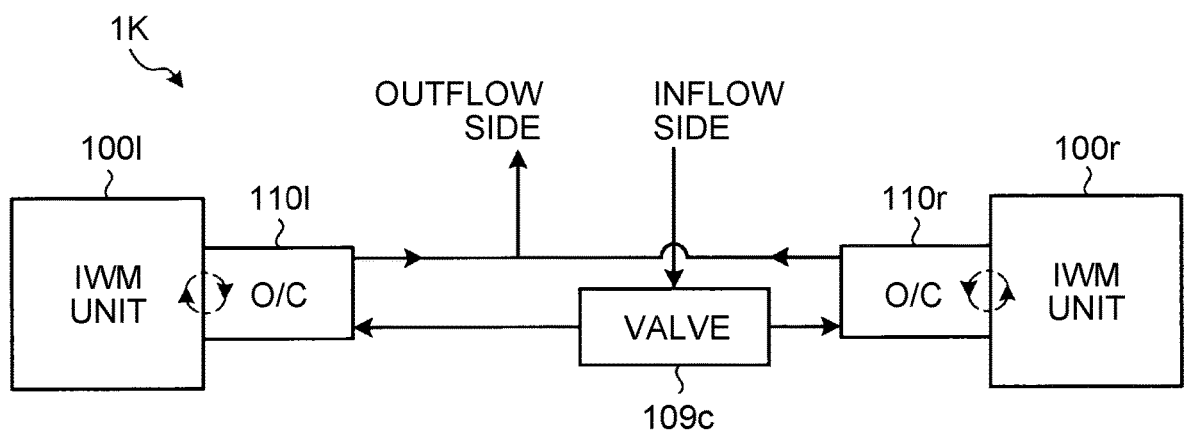
FIG. 11 is a block diagram explaining a cooling mechanism according to a tenth embodiment.

Next, a cooling mechanism in a vehicle according to the tenth embodiment of the present disclosure will be described. FIG. 11 is a block diagram explaining the cooling mechanism according to the tenth embodiment. As shown in FIG. 11, the cooling mechanism according to the tenth embodiment includes a cooling circuit 1K.

As shown in FIG. 11, in the cooling circuit 1K according to the tenth embodiment, different from the ninth embodiment, a valve 109*c* is provided at a branching point where the coolant supplied from the inflow side is distributed to the IWM oil coolers 110*l* and 110*r*. The valve 109*c* is configured in the same manner as the valve 109*a* of the seventh embodiment. The valve 109*c* as a distribution regulating valve is configured to regulate, by the ECU 105, a valve aperture that defines a distribution proportion between flow rates at at least two outflow parts where the coolant flows out.

The ECU 105 is supplied with IWM parameters. The ECU 105 controls the valve aperture of the valve 109*c* based on the inputted IWM parameters. The ECU 105 may be configured to derive IWM parameters from parameters other than the IWM parameters so as to control the valve aperture of the valve 109c based on the derived IWM parameters. Through the control on the valve aperture of the valve 109c by the ECU 105, a distribution between the flow rate of the coolant toward the IWM oil cooler 110l for the left wheel and the flow rate of the coolant toward the IWM oil cooler 110r for the right wheel can be regulated. That is, the distribution of the flow rate of the coolant is changed between the IWM oil coolers 110l and 110r so as to configure the cooling performance to be changeable.

Specifically, it is supposed to generate a difference between the driving force by the IWM unit 100l for the left wheel and the driving force by the IWM unit 100r for the right wheel. For example, when a right steering motion is performed in the vehicle, the number of rotations of the IWM unit 100l for the left wheel becomes greater than the number of rotations of the IWM unit 100r for the right wheel. Because of this, the generated heat amount of the IWM unit 100l for the left wheel becomes greater than the generated heat amount of the IWM unit 100r for the right wheel; thus, the temperature of the IWM unit 100l for the left Wheel is higher than the temperature of the IWM unit 100r for the right wheel. In this case, the ECU 105 controls the valve aperture of the valve 109c so as to increase the flow rate of the coolant toward the IWM oil cooler 110l on the left wheel side, and also reduce the flow rate of the coolant toward the IWM oil cooler 110r on the right wheel side. Through this control, it is possible to rapidly decrease the temperature of the IWM unit 100l for the left wheel to be lower than the temperature of the IWM unit 100r for the right wheel. Accordingly, it is possible to control the respective temperatures of the IWM units 100l, 100r to be substantially equal to each other, to thereby enhance reliability on the cooling mechanism of the vehicle. The other configurations are the same as those of the ninth embodiment.

According to the cooling circuit 1K of the tenth embodiment, the IWM oil coolers 110l, 110r are respectively mounted to the IWM units 100l and 100r, to thereby attain the same as that of the ninth embodiment. In addition, by the valve 109c, it is possible to regulate the distribution between the flow rate of the coolant toward the IWM oil cooler 110l on the left wheel side and the flow rate of the coolant toward the IWM oil cooler 110r on the right wheel side. Accordingly, even if a difference in temperature is generated between the IWM unit 100l for the left wheel and the IWM unit 100r for the right wheel, the temperature of the IWM unit 100l for the left wheel and the temperature of the IWM unit 100r for the right wheel can be controlled to be generally equal to each other.

Eleventh Embodiment

Figure 12:
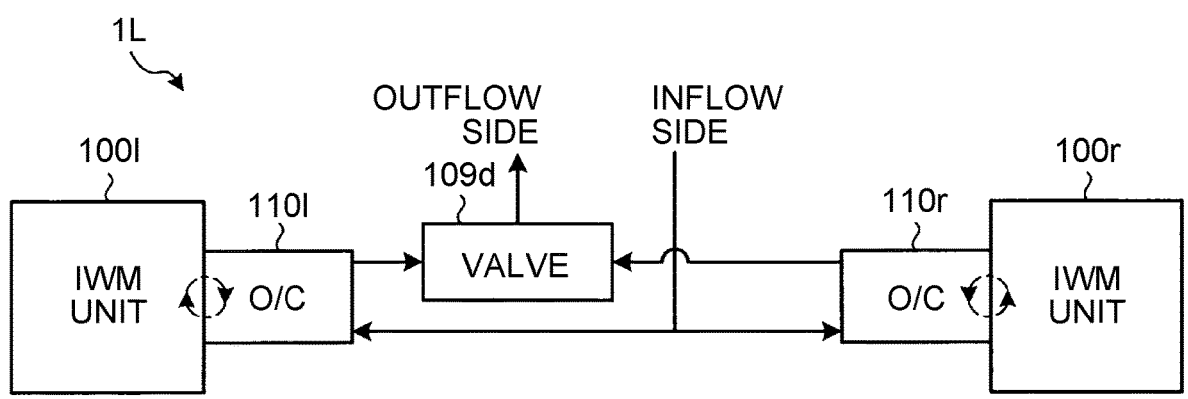
FIG. 12 is a block diagram explaining a cooling mechanism according to an eleventh embodiment.

Next, a cooling mechanism according to the eleventh embodiment of the present disclosure will be described. FIG. 12 is a block diagram explaining the cooling mechanism according to the eleventh embodiment. As shown in FIG. 12, the cooling mechanism according to the eleventh embodiment includes a cooling circuit 1L.

As shown in FIG. 12, in the cooling circuit 1L according to the eleventh embodiment, different from the ninth embodiment, a valve 109d is provided at a joint point where the coolant flowing out from the IWM oil cooler 110l and the coolant flowing out from the IWM oil cooler 110r are joined to each other. The valve 109d is configured in the same manner as the valve 109b of the eighth embodiment. The valve 109d is configured to regulate, the ECU 105, a valve aperture that defines a distribution proportion between flow rates at at least two inflow parts where the coolant flows in.

The ECU 105 is supplied with IWM parameters. The ECU 105 controls the valve aperture of the valve 109d based on inputted IWM parameters or derived IWM parameters. Through the control on the valve aperture of the valve 109d by the ECU 105, it is possible to regulate a distribution between the flow rate of the coolant flowing from the IWM oil cooler 110l for the left wheel into the valve 109d and the flow rate of the coolant flowing from the IWM oil cooler 110r for the right wheel into the valve 109d. Through this distribution control, the flow rate of the coolant supplied from the inflow side of the coolant to the IWM oil cooler 110l on the left wheel side and the flow rate of the coolant supplied from the inflow side of the coolant to the IWM oil cooler 110r on the right wheel side are controlled. That is, the distribution of the flow rate of the coolant is changed between the IWM oil coolers 110l and 110r so as to configure the cooling performance to be changeable. The other configurations are the same as those of the ninth embodiment.

According to the eleventh embodiment, the IWM oil coolers 110l, 100r are directly mounted to the IWM units 100l, 100r, to thereby attain the same effect as that of the ninth embodiment. In addition, by the valve 109d, it is possible to regulate the distribution between the flow rate of the coolant toward the IWM oil cooler 110l on the left wheel side and the flow rate of the coolant toward the IWM oil cooler 110r on the right wheel side; thus, it is possible to attain the same effect as that of the tenth embodiment.

Twelfth Embodiment

Figure 13:
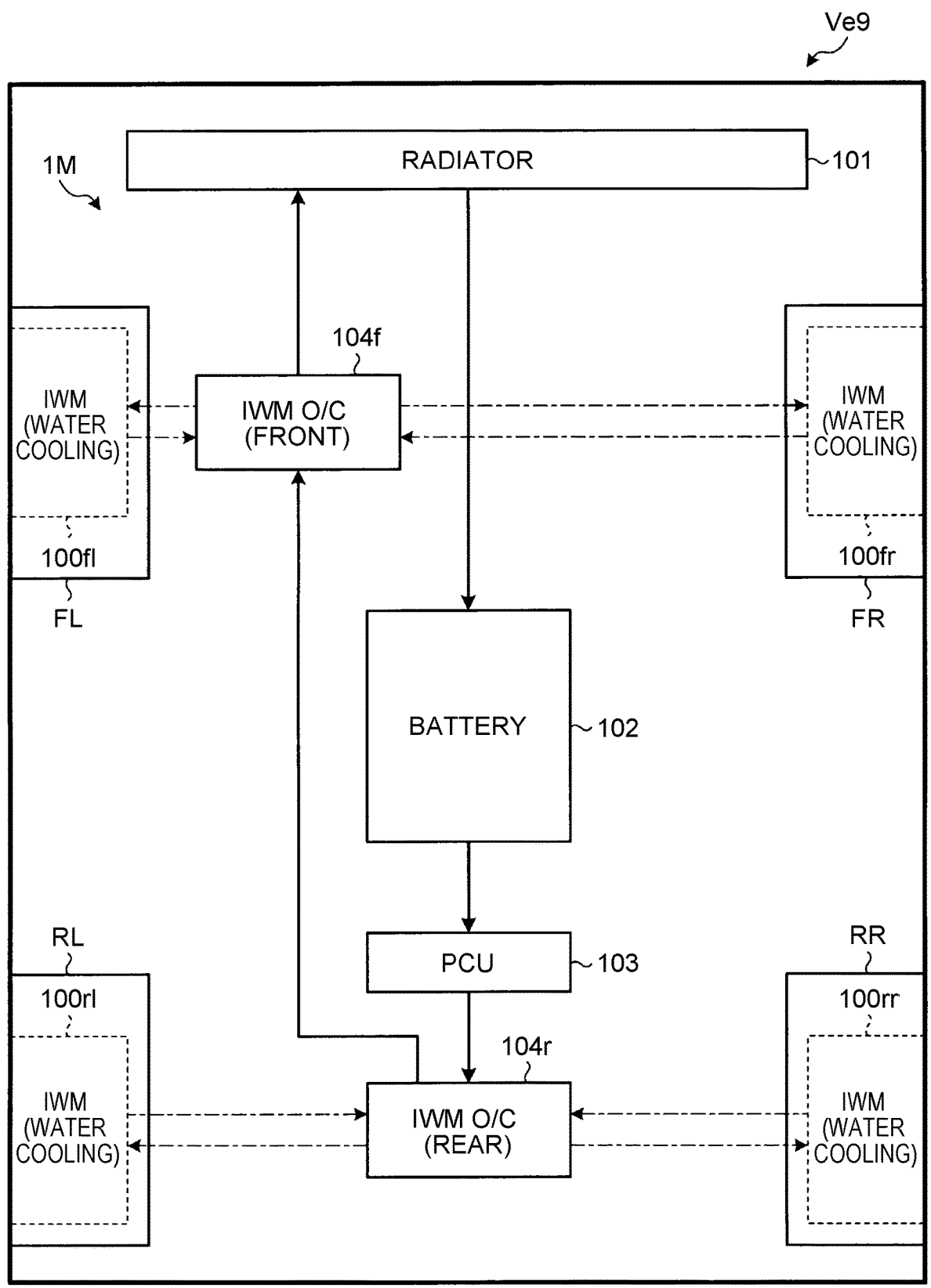
FIG. 13 is a block diagram explaining a cooling mechanism in a vehicle according to a twelfth embodiment.

Next, a cooling mechanism in a vehicle according to the twelfth embodiment of the present disclosure will be described. FIG. 13 is a block diagram explaining the cooling mechanism in a vehicle Ve9 according to the twelfth embodiment. As shown in FIG. 13, the cooling mechanism of the vehicle Ve9 includes a cooling circuit 1M.

In the cooling circuit 1M, different from the first embodiment, an IWM oil cooler 104r on the rear wheel side is integrally configured, and an IWM oil cooler 104f on the front wheel side is integrally configured. That is, the IWM oil cooler 104r according to the twelfth embodiment is configured such that oil after cooling the IWM unit 100rl for the left rear wheel and oil after cooling the IWM unit 100rr for the right rear wheel can be cooled in the same case. Similarly, the IWM oil cooler 104f is configured such that oil after cooling the IWM unit 100fl for the left front wheel and oil after cooling the IWM unit 100fr for the right front wheel can be cooled in the same case. The IWM units 100fl to 100rr are respectively provided with oil pumps (not illustrated) for supplying the oil for cooling to the IWM oil coolers 104f, 104r.

Figure 14A:
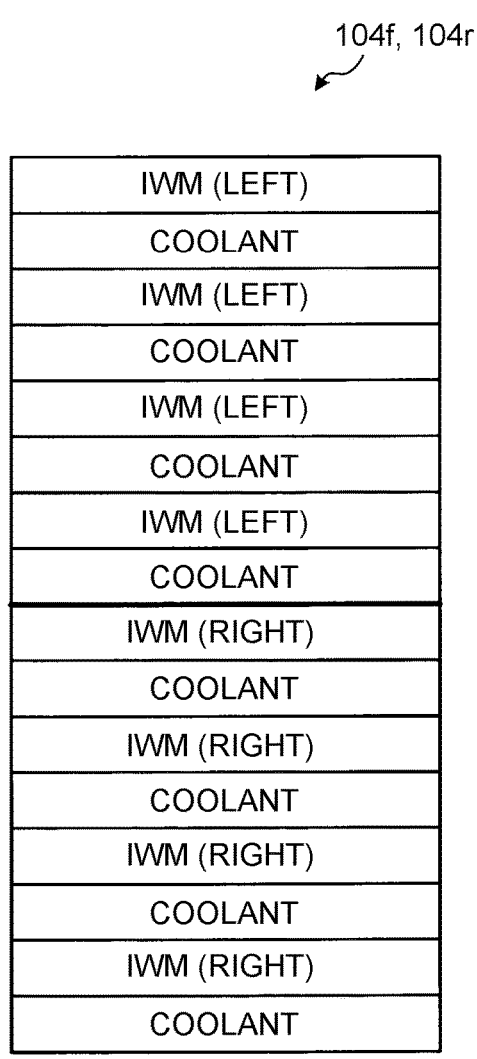
FIG. 14A is a schematic diagram showing an internal configuration of an IWM oil cooler according to a first example.

Here, a first example of the configuration of the IWM oil cooler 104f on the front wheel side and the IWM oil cooler 104r on the rear wheel side will be described. FIG. 14A is a schematic diagram showing a configuration of insides of the IWM oil coolers 104f, 104r according to the first example, and FIG. 14B is a schematic view explaining flows of the oil and the coolant inside the IWM oil coolers 104f, 104r.

As shown in FIG. 14A, in each inside of the IWM oil coolers 104f, 104r according to the first example, oil chambers for the left wheels (IWM (left)) and coolant chambers are arranged so as to be alternately adjacent to each other. The oil chambers for the left wheels (IWM (left)) are flow passages of the oil for the left wheels where the oil supplied from the IWM units 100fl, 100rl for the left wheels flows, and the heat exchange is carried out. The coolant chambers are flow passages for the coolant with which the coolant after passing via the PCU 103 is supplied. Similarly, in each of the IWM oil coolers 104f, 104r, oil chambers for the right wheels (IWM (right)) and coolant chambers are arranged so as to be alternately adjacent to each other. The oil chambers for the right wheels (IWM (right)) are flow passages of the oil for the right wheels where the oil supplied from the IWM units 100fr, 100rr for the right wheels flows, and the heat exchange is carried out. In FIG. 14A, the coolant chambers and the oil chambers for the left wheels (IWM (left)) alternately arranged in multiple layers are stacked on the coolant chambers and the oil chambers for the right wheels (IWM (right)) alternately arranged in multiple layers; but they are not limited to this configuration. That is, in the IWM oil coolers 104f, 104r, the oil chamber for the left wheels and the coolant chambers may be arranged side by side repetitively in the lateral direction as far as they are alternately adjacent to each other. Similarly, the oil chamber for the right wheels and the coolant chambers may be arranged side by side repetitively in the lateral direction in the state that they are alternately adjacent to each other. In addition, the coolant chambers and the oil chambers for the right wheels alternately arranged in multiple layers may be stacked on the coolant chambers and the oil chambers for the left wheels alternately arranged in multiple layers.

Figure 14B:
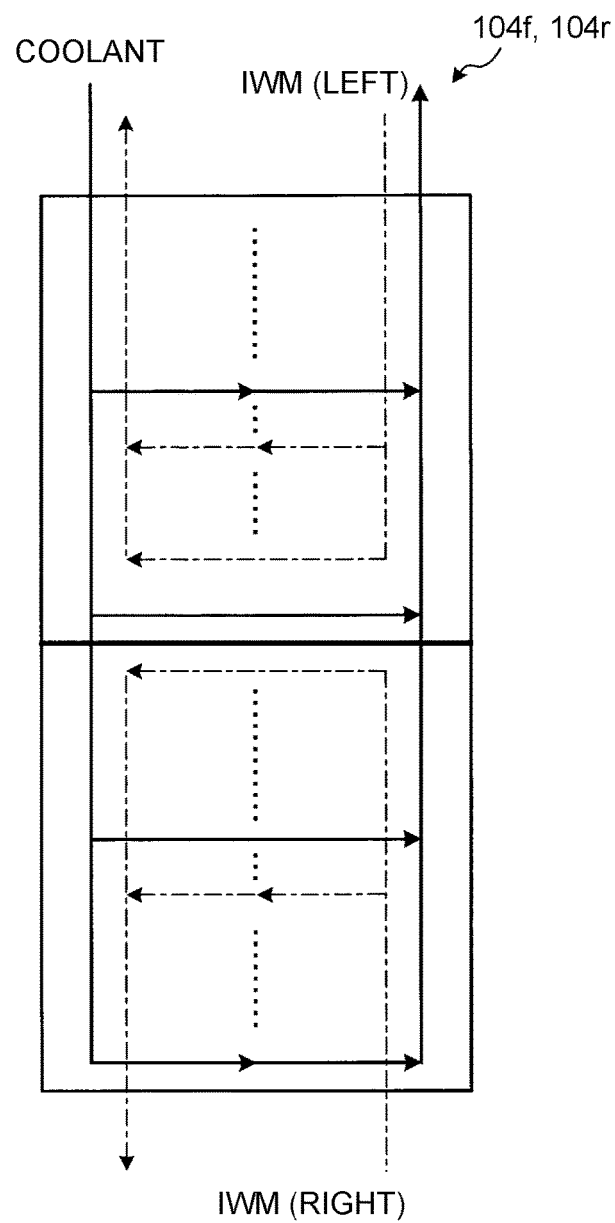
FIG. 14B is a schematic diagram explaining flows of an oil and a coolant inside the IWM oil cooler according to the first example.

As shown in FIG. 14B, inside the case of the IWM oil coolers 104f, 104r, the coolant flows in from one side (a left part in FIG. 14B) of one end (an upper part in FIG. 14B), passes through the respective coolant chambers, and thereafter flows out from the other side (a right part in FIG. 14B) of the same end. The oil for the left wheels (IWM (left)) supplied from the IWM units 100fl, 100rl for the left wheels flows in from the other side (the right part in FIG. 14B) of the one end (the upper part in FIG. 14B), passes through the respective oil chambers for the left wheels, and thereafter flows out from the one side (the left part in FIG. 14B) of the same end. The oil for the right wheels (IWM (right)) supplied from the IWM units 100fr, 100rr for the right wheels flows in from the other side (the right part in FIG. 14B) of the other end (a lower part in FIG. 14B), passes through the respective oil chambers for the right wheels, and thereafter flows out from the one side (the left part in FIG. 14B) of the same end. The other configurations are the same as those of the first embodiment.

In this case, heat exchange is carried out between the oil for the left wheels and the coolant so as to cool the oil for the left wheels, and at the same time, heat exchange is carried out between the oil for the right wheels and the coolant so as to cool the oil for the right wheels. In this case, the oil flow direction in the oil chamber for the left wheels and in the oil chamber for the right wheels is inverse to the coolant flow direction in the coolant chambers. Through this, it is possible to reduce change in temperature difference along the flow directions between the flowing oil and the coolant, to thereby efficiently carry out the oil cooling by the coolant.

As aforementioned, in the first example of the twelfth embodiment, the oil supplied from the IWM units 100fl, 100rl for the left wheels and the oil supplied from the IWM units 100fr, 100rr for the right wheels are cooled by the common coolant. With this configuration, different from the first to the eleventh embodiments, it becomes unnecessary to provide two oil coolers, one IWM oil cooler for each left wheel and the other IWM oil cooler for each right wheel, to thereby reduce the number of components required to be installed in the vehicle.

Next, a second example of the configurations of the IWM oil cooler 104f on the front wheel side and the IWM oil cooler 104r on the rear wheel side will be described. FIG. 15A is a schematic diagram showing a configuration of each inside of the IWM oil coolers 104f, 104r according to the second example, and FIG. 15B is a schematic view explaining flows of the oil and the coolant inside the IWM oil coolers 104f, 104r.

As shown in FIG. 15A, in each of the IWM oil coolers 104f, 104r according to the second example, the oil chambers for the left wheels (IWM (left)), the coolant chambers, and the oil chambers for the right wheels (IWM (right)) are arranged so as to be alternately adjacent to each other in turn in a repetitive manner. That is, each oil chamber for the left wheel and each coolant chamber are adjacent to each other, each coolant chamber and each oil chamber for the right wheel are adjacent to each other, and each oil chamber for the right wheel and each oil chamber for the left wheel are adjacent to each other. The oil chambers for the left wheels, the coolant chambers, and the oil chambers for the right wheels are configured in the same manner as those of the first example. In addition, in the FIG. 15A, structures each of which is formed by stacking a single oil chamber for the right wheel, a single coolant chamber, and a single oil chamber for the left wheel in turn, are stacked in multiple layers, but they are not limited to this configuration. That is, in the IWM oil coolers 104f, 104r, the oil chambers for the right wheels, the coolant chambers, and the oil chambers for the left wheels may be arranged in turn in the lateral direction in a repetitive manner as far as they are alternately adjacent to each other, or the oil chambers for the left wheels, the coolant chambers, and the oil chambers for the right wheels may be stacked in turn.

As shown in FIG. 15B, inside the IWM oil coolers 104f, 104r, the coolant flows in from one side (a left part in FIG. 15B) of one end (an upper part in FIG. 15B), passes through the respective coolant chambers, and thereafter flows out from the other side (a right part in FIG. 15B) of the same end. The oil for the left wheels (IWM (left)) supplied from the IWM units 100fl, 100rl for the left wheels flows in from the other side (the right part in FIG. 15B) of the one end (the upper part in FIG. 15B), passes through the respective oil chambers for the left wheels, and thereafter flows out from the one side (the left part in FIG. 15B) of the same end. The oil for the right wheels (IWM (right)) supplied from the IWM units 100fr, 100rr for the right wheels flows in from the other side (the right part in FIG. 15B) of the other end (a lower part in FIG. 15B), passes through the respective oil chambers for the right wheels, and thereafter flows out from the one side (the left part in FIG. 15B) of the same end.

In this case, heat exchange is carried out between the oil for the left wheels and the coolant, between the coolant and the oil for the right wheels, and between the oil for the left wheels and the oil for the right wheels, respectively. Through this, the oil for the left wheels and the oil for the right wheels are cooled by the common coolant, and at the same time, heat exchange is carried out between the oil for the right wheels and the oil for the left wheels. The other configurations are the same as those of the first example.

According to the second example of the twelfth embodiment, the oil for the left wheels supplied from the IWM units 100fl, 100rl for the left wheels and the oil for the right wheels supplied from the IWM units 100fr, 100rr for the right wheels are cooled by the common coolant, to thereby attain the same effect as that of the first example. In addition, the heat exchange is carried out between the oil for the left wheels and the oil for the right wheels, to thereby set the temperature of the oil for the left wheels for cooling the IWM units 100*fl*, 100*rl* for the left wheels and the temperature of the oil for the right wheels for cooling the IWM units 100*fr*, 100*rr* for the right wheels to be substantially equal to each other. Accordingly, it is possible to suppress demagnetization of magnets composing the motors in the IWM units 100*fl* to 100*rr*. In addition, when agitation loss in the IWM units 100*fl* to 100*rr* becomes greater at a lower temperature, and even if a difference in temperature is generated between the IWM units 100*fl*, 100*rl* for the left wheels and the IWM units 100*fr*, 100*rr* for the right wheels, the temperatures of the IWM units 100*fl* to 100*rr* can be increased on the average, to thereby reduce mechanical friction.

Thirteenth Embodiment

Figure 16:
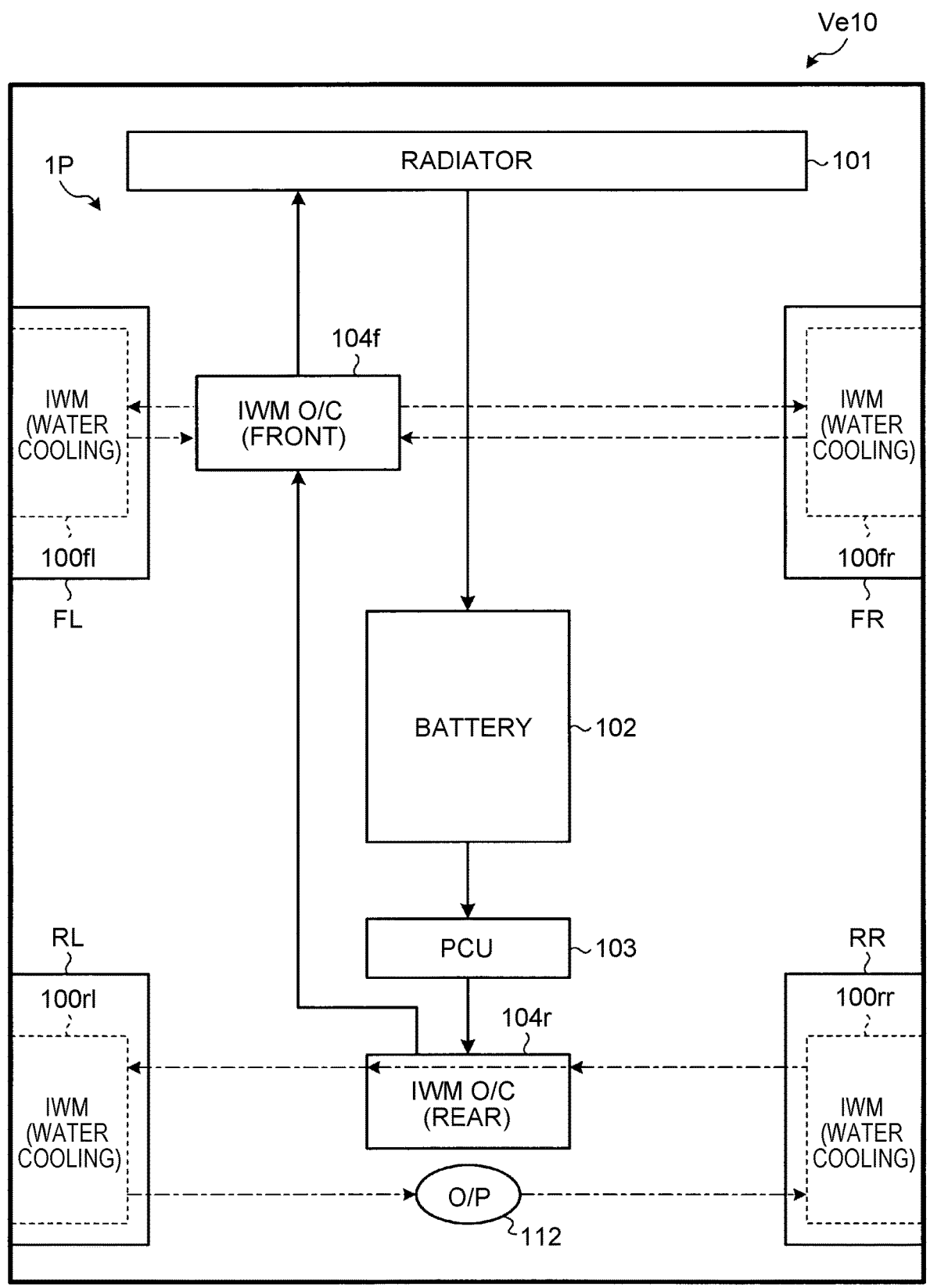
FIG. 16 is a block diagram explaining a cooling mechanism in a vehicle according to a thirteenth embodiment.

Next, a cooling mechanism in a vehicle according to the thirteenth embodiment of the present disclosure will be described. FIG. 16 is a block diagram explaining the cooling mechanism in a vehicle Ve10 according to the thirteenth embodiment. As shown in FIG. 16, the cooling mechanism of the vehicle Ve10 includes a cooling circuit 1P.

In the cooling circuit 1P, the IWM oil cooler 104*r* on the rear wheel side is integrally configured, and the IWM oil cooler 104*f* on the front wheel side is integrally configured. The IWM oil coolers 104*f*, 104*r* are configured in the same manner as the IWM oil coolers 104*fl* to 104*rr* according to the first to the eighth embodiments, and heat exchange is carried out between the coolant and the oil. In addition, there is provided an oil pump 112 circulating the oil between the IWM units 100*rl*, 100*rr* and the IWM oil cooler 104*r* on the rear wheel side.

In the cooling circuit 1P, by driving the oil pump 112, for example, the oil is supplied to the IWM unit 100*rr* for the right rear wheel, the IWM oil cooler 104*r*, and the IWM unit 100*rl* for the left rear wheel in turn. Inversely, the oil may be supplied to the IWM unit 100*rl* for the left rear wheel, the IWM oil cooler 104*r*, and the IWM unit 100*rr* for the right rear wheel in turn. The other configurations are the same as those of the twelfth embodiment.

According to the thirteenth embodiment, each of the IWM oil cooler 104*r* on the rear wheel side and the IWM oil cooler 104*f* on the front wheel side is integrally configured; thus, it is possible to reduce the number of the IWM oil coolers installed in the vehicle Ve10. In addition, it is unnecessary to provide each of the IWM units 100*fl*, 100*rr* with an oil pump for supplying the oil to the IWM oil cooler 104*r*; therefore, it is possible to halve the number of oil pumps installed in the vehicle Ve10, thus reducing the number of components. Accordingly, in the vehicle Ve10, it is possible to attain reduction in cost and weight.

Hereinafter, a variation of the thirteenth embodiment will be described. In this variation, as the oil pump 112 according to the thirteenth embodiment, an oil pump capable of carrying out switching between suction and discharge of the oil. In this ease, in the cooling circuit 1P shown in FIG. 16, for example, it is configured to be able to mutually switch the circulation direction of the oil through control on the oil pump 112 by the ECU 105 (not illustrated in FIG. 16). Specifically, it is configured to carry out mutual switching between a circulation direction in which the oil is supplied from the IWM oil cooler 104*r* to the IWM unit 100*rl* and the IWM unit 100*rr* in turn and a circulation direction in which the oil is supplied from the IWM oil cooler 104*r* to the IWM unit 100*rr* and the IWM unit 100*rl* in turn. Through this configuration, if a difference in temperature is generated between the IWM unit 100*rr* for the right rear wheel and the IWM unit 100*rl* for the left rear wheel, by carrying out the switching between discharge and suction of the oil in the oil pump 112, the difference in temperature can be reduced. That is, by carrying out the switching between discharge and suction of the oil in the oil pump 112, it is possible to select which one of the IWM units 100*rl* and 100*rr* should preferentially be supplied with oil whose temperature is the lowest of the circulating oil after being cooled in the IWM oil cooler 104*r*. Through this control, it is possible to preferentially supply the oil whose temperature is the lowest of the circulating oil to either IWM unit having a higher temperature of the IWM units 100*rl*, 100*rr*.

According to the above-described variation of the thirteenth embodiment, it is possible to set the temperature of the IWM unit 100*rr* for the right rear wheel and the temperature of the IWM unit 100*rl* for the left rear wheel to be substantially equal to each other. Through this, it is possible to suppress demagnetization of the magnets composing the motors in the IWM units 100*fl* to 100*rr*. In addition, when agitation loss in the IWM units 100*rl* to 100*rr* becomes greater at a lower temperature, and if a difference in temperature is generated between the IWM unit 100*rl* for the left rear wheel and the IWM unit 100*rr* for the right rear wheel, the temperatures of the IWM units 100*rl* and 100*rr* can be increased on the average, to thereby reduce mechanical friction.

Fourteenth Embodiment

Figure 17:
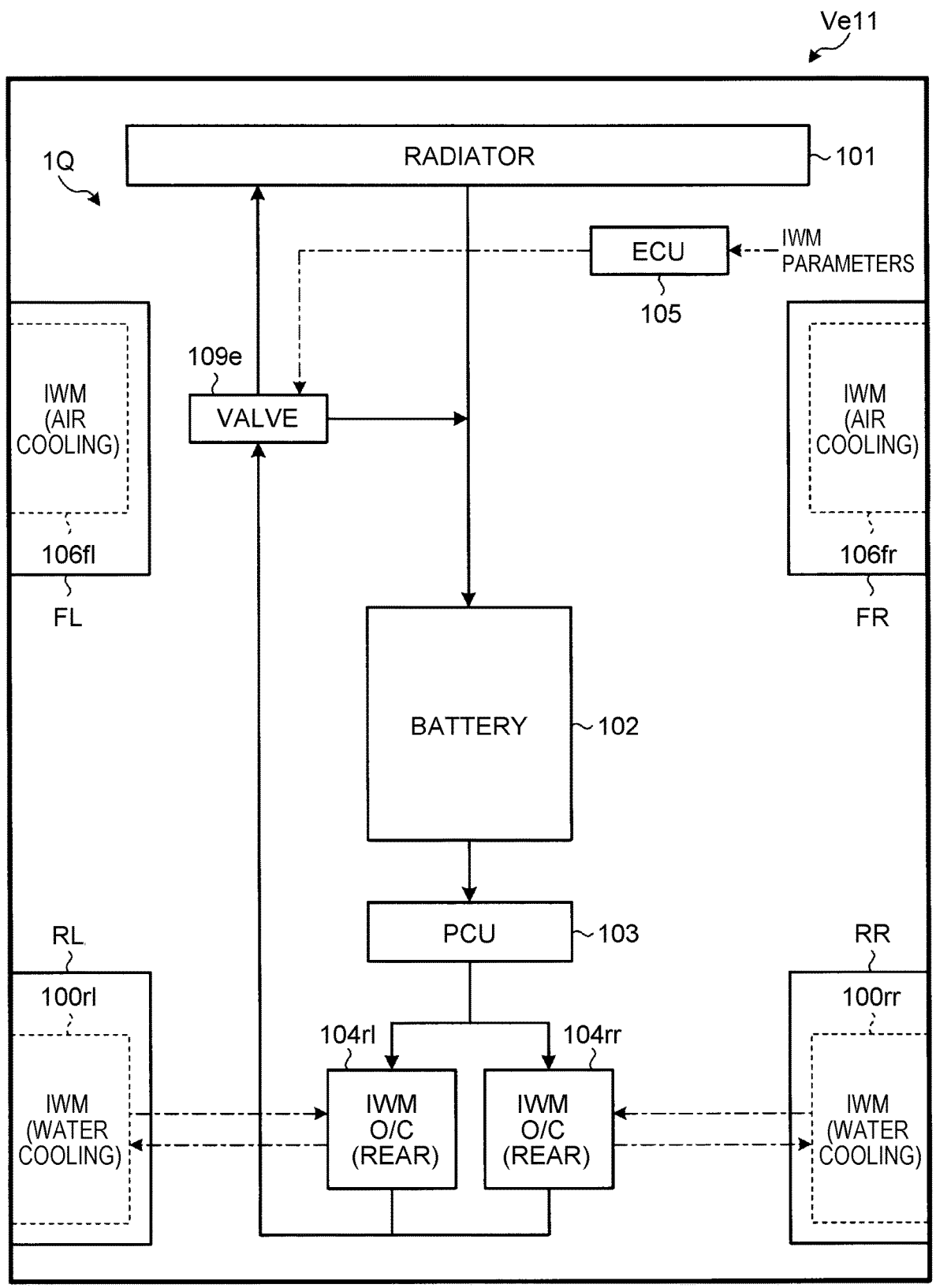
FIG. 17 is a block diagram explaining a cooling mechanism in a vehicle according to a fourteenth embodiment.

Next, a cooling mechanism in a vehicle according to the fourteenth embodiment of the present disclosure will be described. FIG. 17 is a block diagram explaining the cooling mechanism in a vehicle Ve11 according to the fourteenth embodiment. As shown in FIG. 17, the cooling mechanism of the vehicle Ve11 includes a cooling circuit 1Q.

In the cooling circuit 1Q, different from the second embodiment, a valve 109*e* is provided at a position located downstream of the IWM oil coolers 104*rl*, 104*rr* on the rear wheel side and upstream of the radiator 101, along the flowing direction of the coolant. The valve 109*e* is a valve for distributing the coolant passing via the IWM oil coolers 104*rl*, 104*rr* to the radiator 101 and to a flow passage between the radiator 101 and the battery 102. The valve 109*e* as an inflow-side distribution valve is configured to regulate a valve aperture that defines a distribution proportion of flow rates at at least two outflow parts where the coolant flows out by the ECU 105 to control respective components of the vehicle Ve11.

The ECU 105 is supplied with IWM parameters. The ECU 105 controls the valve aperture of the valve 109*e* based on the inputted IWM parameters. Through the control on the valve 109*e* by the ECU 105, of the flow rate of the coolant passing via the IWM oil coolers 104*rl*, 104*rr*, a distribution between a flow rate of the coolant toward the radiator 101 and a flow rate of the coolant toward the flow passage on the outflow-side of the radiator 101 can be regulated. A specific example of the flow passage on the outflow side of the radiator 101 may include the flow passage between the radiator 101 and the battery 102, for example; but the flow passage on the outflow side of the radiator 101 is not always limited to this example. By controlling the valve aperture of the valve 109*e*, it is possible to control the flow rate of the coolant bypassing the radiator 101. The other configurations are the same as those of the second embodiment.

According to the fourteenth embodiment, the valve 109e is provided on the inflow side of the radiator 101 so as to divert part of the coolant flowing into the radiator 101 toward the outflow side of the radiator 101. Through this, it is possible to reduce the amount of the coolant cooled by the radiator 101; therefore, if the vehicle Ve11 is started up at the coldest time in a cold region or the like, the coolant increased in temperature can be used for temperature adjustment of the battery 102, such as warming-up of the battery 102. Accordingly, it is possible to maintain the temperature of the battery 102 at a proper temperature, to thereby enhance service duration of the battery 102. In addition, since the coolant whose temperature is increased can be used for increasing the temperatures of the MN units 100rl, 100rr, it is possible to reduce agitation loss in the oil in the IWM units 100rl, 100rr. Accordingly, it is possible to greatly improve electrical efficiency in the vehicle Ve11, and thus a cruising distance of the vehicle Ve11 can be increased.

Fifteenth Embodiment

Figure 18:
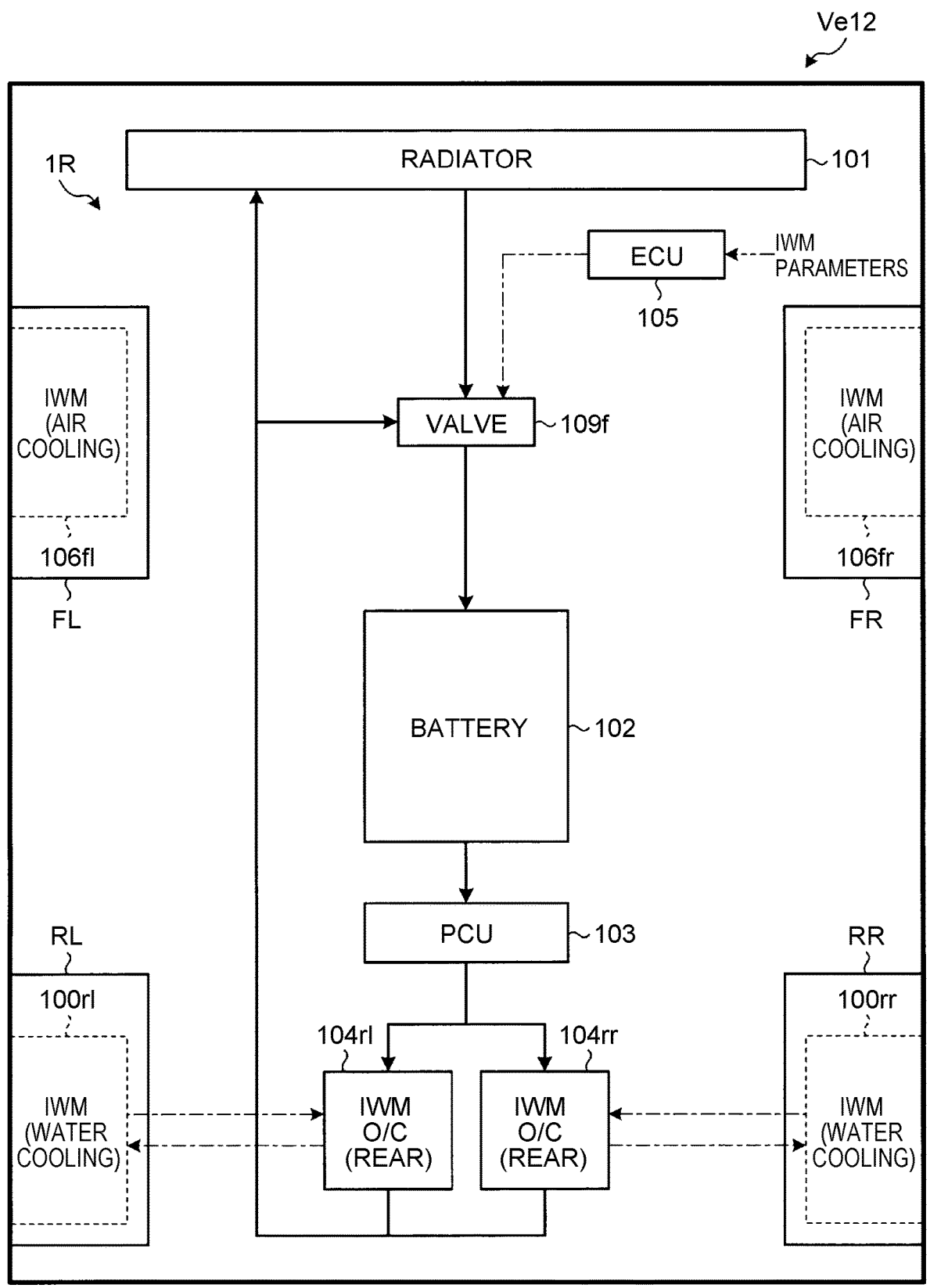
FIG. 18 is a block diagram explaining a cooling mechanism in a vehicle according to a fifteenth embodiment.

Next, a cooling mechanism in a vehicle according to the fifteenth embodiment of the present disclosure will be described. FIG. 18 is a block diagram explaining the cooling mechanism in a vehicle Ve12 according to the fifteenth embodiment. As shown in FIG. 18, the cooling mechanism of the vehicle Ve12 includes a cooling circuit 1R.

In the cooling circuit 1R, different from the fourteenth embodiment, a valve 109f is provided at a position located downstream of the radiator 101 along the flowing direction of the coolant. On the downstream of the IWM oil coolers 104rl, 104rr along the flowing direction of the coolant, a flow passage of the coolant supplied to the valve 109f branches from a flow passage of the coolant supplied to the radiator 101. The valve 109f as an outflow-side joint valve is configured to regulate a valve aperture that defines a distribution proportion of flow rates at two inflow parts where the coolant flows in by the ECU 105.

The ECU 105 controls the valve aperture of the valve 109f based on the inputted IWM parameters. Through control on the valve aperture of the valve 109b by the ECU 105, the distribution between the flow rates of the coolant flowing from the IWM oil coolers 104rl, 104rr into the radiator 101 and into the valve 109f are controlled. The other configurations are the same as those of the fourteenth embodiment.

According to the fifteenth embodiment, the valve 109f is provided on the outflow side of the radiator 101, and the flow passage of the coolant supplied to the valve 109f is configured to branch from the flow passage of the coolant supplied to the radiator 101. With this configuration, part of the coolant flowing into the radiator 101 is diverted to the valve 109f so as to be joined to the coolant flowing out from the radiator 101. Accordingly, it is possible to reduce the amount of the coolant cooled by the radiator 101, to thereby attain the same effect as that of the fourteenth embodiment.

As aforementioned, the embodiments of the present disclosure have been specifically described, but the present disclosure is not limited to the aforementioned embodiments, and various modifications based on the technical concepts of the present disclosure may be made. For example, the numerical values exemplified in the above described embodiments are merely examples, and numerical values different from them may be used as necessary.

In the aforementioned tenth embodiment, it has been described that when the vehicle is turned, the number of rotations becomes different between the left IWM unit 100*l* and the right IWM unit 100*r*, but the difference between these units is not limited to this case. That is, also in the case in which the driving force is different between the left IWM unit 100*l* and the right IWM unit 100*r* during the turning of the vehicle or in the case in which the cooling amount becomes different between the left IWM unit 100*l* and the right IWM unit 100*r* due to the wind orientation outside of the vehicle, it is possible to reduce the difference in temperature between the left IWM unit 100*l* and the right IWM unit 100*r*, to thereby further enhance reliability on the IWM units 100*l*, 100*r*.

In the aforementioned thirteenth embodiment, there is provided the oil pump 112 that circulates the oil between the IWM units 100rl, 100rr for the rear wheels and the IWM oil cooler 104r on the rear wheel side, but this is not always limited to the rear wheel side. That is, there may be provided an oil pump that circulates the oil between the IWM units 100fl, 100fr for the front wheels and the IWM oil cooler 104f on the front wheel side. In addition, there may be provided oil pumps on both the front wheel side and the rear wheel side.

The aforementioned first to fifteenth embodiments may be implemented by mutually combining them, appropriately. In addition, in the aforementioned first to fifteenth embodiments, even if both the battery 102 and the PCU 103 are provided, it may be configured to cool only one of the battery 102 and the PCU 103.

What is claimed is:

1. A vehicle comprising:
   multiple wheels for traveling;
   in-wheel motors provided to the respective wheels, the in-wheel motors being configured to drive the respective wheels, the in-wheel motors being lubricated by an oil;
   a cooling medium circuit in which a cooling medium flows;
   a cooling device configured to cool the cooling medium;
   heat exchangers configured to carry out heat exchange between the cooling medium and the oil after lubricating the in-wheel motors; and
   at least one of a battery and a controller including an inverter, the battery and the controller being configured to be cooled by the cooling medium flowing through the cooling medium circuit, wherein
   the cooling medium circuit is configured to circulate the cooling medium through the cooling device, the at least one of the battery and the controller, and the heat exchangers in turn.

2. The vehicle according to claim 1, wherein
   the in-wheel motors include in-wheel motors for front wheels and in-wheel motors for rear wheels,
   the heat exchangers include a heat exchanger for the front wheels and a heat exchanger for the rear wheels,
   the heat exchanger for the front wheels is configured to carry out heat exchange with the oil after flowing through the in-wheel motors for the front wheels, and is disposed at a frontward position in a front-rear direction of the vehicle, and
   the heat exchanger for the rear wheels is configured to carry out heat exchange with the oil after flowing through the in-wheel motors for the rear wheels, and is disposed at a rearward position in the front-rear direction of the vehicle.

3. The vehicle according to claim 2, wherein
   the cooling device is provided at the frontward position in the vehicle, and the heat exchanger for the front wheels is provided downstream of the heat exchanger for the rear wheels along a flowing direction of the cooling medium in the cooling medium circuit.

4. The vehicle according to claim 2, wherein
the cooling device is provided at the frontward position in the vehicle, and
a branching point between a first cooling-medium flow passage connected to the heat exchanger for the front wheels and a second cooling-medium flow passage connected to the heat exchanger for the rear wheels is located downstream of at least one of the controller and the battery, along a flowing direction of the cooling medium in the cooling medium circuit.

5. The vehicle according to claim 4, further comprising:
a distribution regulating valve configured to regulate a distribution of a flow rate to the first cooling-medium flow passage and a flow rate to the second cooling-medium flow passage when the cooling medium is distributed to the first cooling-medium flow passage and the second cooling-medium flow passage in the cooling medium circuit; and
an electronic control unit configured to control the distribution of the flow rates in the distribution regulating valve, wherein
the cooling medium circuit includes a joint point, the first cooling-medium flow passage and the second cooling-medium flow passage are joined to each other at the joint point,
the distribution regulating valve is provided to the branching point or the joint point in the cooling medium circuit, and
the electronic control unit is configured to control an aperture of the distribution regulating valve based on parameters contributing to heat generation of the in-wheel motors for the front wheels and the in-wheel motors for the rear wheels.

6. The vehicle according to claim 1, wherein
the in-wheel motors include in-wheel motors for front wheels and in-wheel motors for rear wheels, and
the cooling medium circuit is provided to in-wheel motors for wheels not steered among the in-wheel motors for the front wheels and the in-wheel motors for the rear wheels,
the vehicle further comprising
an electronic control unit configured to change a distribution between driving force of the in-wheel motors for the front wheels and driving force of the in-wheel motors for the rear wheels based on temperatures or generated heat amounts of the in-wheel motors for the front wheels and the in-wheel motors for the rear wheels.

7. The vehicle according to claim 1, further comprising:
an air heater introducing air into a cabin of the vehicle, temperature of the air introduced into the cabin is increased through heat exchange with the cooling medium, wherein
the in-wheel motors include in-wheel motors for rear wheels,
the heat exchangers include a heat exchanger for the rear wheels,
the heat exchanger for the rear wheels is configured to carry out heat exchange with the oil after flowing through the in-wheel motors for the rear wheels, and
the air heater is provided downstream of the heat exchanger for the rear wheels along a flowing direction of the cooling medium.

8. The vehicle according to claim 1, wherein
the in-wheel motors include in-wheel motors for left wheels and in-wheel motors for right wheels, and
the heat exchangers arc configured to carry out heat exchange between oil for the left wheels flowing out from the in-wheel motors for the left wheels as well as oil for the right wheels flowing out from the in-wheel motors for the right wheels, and the cooling medium flowing into the same case of the heat exchangers.

9. The vehicle according to claim 1, further comprising an oil pump, wherein
the in-wheel motors include in-Wheel motors for left wheels and in-wheel motors for right wheels, and
the oil pump is configured to circulate the oil among the heat exchanger, the in-wheel motors for the left wheels, and the in-wheel motors for the right wheels.

10. The vehicle according to claim 9, wherein
the oil pump is configured to switch a circulating direction of the oil among the heat exchanger, the in-wheel motors for the left wheels, and the in-wheel motors for the right wheels.

11. The vehicle according to claim 1, further comprising:
an inflow-side distribution valve configured to distribute the cooling medium to a cooling medium to flow into the cooling device and to a cooling medium to be diverted toward the cooling medium circuit from the cooling device to the battery or the controller; and
an electronic control unit configured to control a distribution proportion in the inflow-side distribution valve between a flow rate of the cooling medium to flow into the cooling device and a flow rate of the cooling medium to be diverted to an outflow-side of the cooling device, based on parameters contributing to heat generation of the in-wheel motors.

12. The vehicle according to claim 1, further comprising:
an outflow-side joint valve provided to the cooling medium circuit from the cooling device to the battery or to the cooling medium circuit from the cooling device to the controller, and the outflow-side joint valve being configured to regulate a flow rate of the cooling medium flowing out from the cooling device and a flow rate of the cooling medium diverted from the cooling medium flowing into the cooling device; and
an electronic control unit configured to control a flow rate of the cooling medium that is diverted from the cooling medium flowing into the cooling device, and flows into the outflow-side joint valve, based on parameters contributing to heat generation of the in-wheel motors.

13. The vehicle according to claim 1, wherein
the in-wheel motors include in-wheel motors for left wheels and in-wheel motors for right wheels,
the heat exchangers include a heat exchanger for a left wheel and a heat exchanger for a right wheel,
the heat exchanger for the left wheel is directly mounted to at least one of the in-wheel motors for left wheels, and
the heat exchanger for the right wheel is directly mounted to at least one of the in-wheel motors for right wheels.

14. The vehicle according to claim 13, further comprising:
a distribution regulating valve configured to regulate a distribution of flow rates to multiple cooling-medium flow passages when the cooling medium is distributed to the multiple cooling-medium flow passages in the cooling medium circuit; and
an electronic control unit configured to control the distribution of the flow rates in the distribution regulating valve, wherein the distribution regulating valve is disposed between the heat exchanger for the left wheel and the heat exchanger for the right wheel in the cooling medium circuit, and the electronic control unit is configured to control a distribution proportion between a flow rate of the cooling medium toward the heat exchanger for the left wheel and a flow rate of the cooling medium toward the heat exchanger for the right wheel based on parameters contributing to heat generation of the in-wheel motors for the left wheels and the in-wheel motors for the right wheels.

15. The vehicle according to claim 1, wherein the cooling medium circuit is configured to circulate the cooling medium through the cooling device, the battery, the controller, and the heat exchangers in turn.

* * * * *